US012804017B2

(12) United States Patent
Foti

(10) Patent No.: US 12,804,017 B2
(45) Date of Patent: Nov. 17, 2026

(54) METHODS, AND NETWORK NODES FOR HANDLING COMMUNICATION IN A COMMUNICATION NETWORK

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 139 days.

(21) Appl. No.: 18/846,872

(22) PCT Filed: Mar. 6, 2023

(86) PCT No.: PCT/SE2023/050201
§ 371 (c)(1),
(2) Date: Sep. 13, 2024

(87) PCT Pub. No.: WO2023/177341
PCT Pub. Date: Sep. 21, 2023

(65) Prior Publication Data
US 2025/0202955 A1 Jun. 19, 2025

Related U.S. Application Data

(60) Provisional application No. 63/363,581, filed on Apr. 26, 2022, provisional application No. 63/269,348, filed on Mar. 15, 2022.

(51) Int. Cl.
*H04L 65/1063* (2022.01)
*H04L 47/80* (2022.01)
*H04L 65/1016* (2022.01)
*H04L 65/1069* (2022.01)
*H04L 65/401* (2022.01)

(52) U.S. Cl.
CPC ........ *H04L 65/1063* (2013.01); *H04L 47/801* (2013.01); *H04L 65/1016* (2013.01); *H04L 65/1069* (2013.01); *H04L 65/401* (2022.05)

(58) Field of Classification Search
CPC ............... H04L 65/1063; H04L 47/801; H04L 65/1016; H04L 65/1069; H04L 65/401
See application file for complete search history.

(56) References Cited

U.S. PATENT DOCUMENTS

2018/0077001 A1* 3/2018 Noldus ............... H04L 65/1016

OTHER PUBLICATIONS

Walter Zielinski, IMS Data ChannelWhite Paper Version 1.0, 21, Dec. 2021 (Year: 2021).*
Walter, Zielinski, "NG. 129—IMS Data Channel White Paper", Dec. 21, 2021, GSM Association, GSMA, GB, XP 93038980 A, pp. 1-105.
Bai (CMCC), Xueqian, "LS to 3GPP on IMS Data Channel Architecture", 5GJA18_109r1, SA WG2 Meeting #S2-148E, S2-2108297, XP 52075537A, Nov. 1-22, 2021.

* cited by examiner

*Primary Examiner* — Angela Widhalm De Rodriguez
(74) *Attorney, Agent, or Firm* — FBT Gibbons LLP

(57) ABSTRACT

Embodiments herein may relate to a method performed by a first network node, such as a IMS AS, for handling an IMS session of one or more UEs in a communication network. The first network node obtains data relating to bootstrapping of data channel information to the IMS session; and reserves one or more needed media resources at a second network node 14, such as the enhanced MRF, for bootstrapping data channel information to the IMS session.

18 Claims, 19 Drawing Sheets

METHODS, AND NETWORK NODES FOR HANDLING COMMUNICATION IN A COMMUNICATION NETWORK

This application is a national-phase entry under 35 USC § 371 of International Application No. PCT/SE2023/050201, filed Mar. 6, 2023, titled "Methods, and Network Nodes for Handling Communication in a Communication Network," which claims the priority of U.S. Provisional Patent Application No. 63/269,348, filed Mar. 15, 2022, titled "Methods, and Network Nodes for Handling Communication in a Communication Network," and U.S. Provisional Patent Application No. 63/363,581, filed Apr. 26, 2022, titled "Methods, and Network Nodes for Handling Communication in a Communication Network," the contents of which are hereby incorporated herein in its entirety.

TECHNICAL FIELD

Embodiments herein relate to a first network node, a second network node, a third network node and methods performed therein regarding wireless communication. Furthermore, a computer program product and a computer-readable storage medium are also provided herein. In particular, embodiments herein relate to handling communication, such as Internet Protocol (IP) Multimedia Subsystem (IMS) sessions, in a communication network.

BACKGROUND

In a typical communication network, user equipments (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. One or more radio network nodes operate on radio frequencies to communicate over an air interface with the UEs within range of the radio network node. Respective radio network node communicates over a downlink (DL) to the UE and the UE communicates over an uplink (UL) to the respective radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g., as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as $6^{th}$ generation (6G) networks and development of 5G such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the 5G technologies such as NR, the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

The Internet Protocol (IP) Multimedia Subsystem (IMS) is a well-known 3GPP standard allowing sessions to be setup between two or more parties for a broad variety of services such as voice or video call, interactive messaging sessions or third-party specific applications. A protocol chosen by 3GPP is the Session Initiation Protocol (SIP). The SIP provides a mechanism for registration of UEs and for setting up multimedia sessions. The SIP REGISTER method enables the registration of user agent's current location and the SIP INVITE method enables the setting up of a session. IMS is implemented by Public Land Mobile Network (PLMN) operators as an architectural framework for delivering IP multimedia services to their subscribers.

IMS Data Channel (DC), which is a new addition to the existing IMS framework, enables users initiating IMS calls to other peers or to enterprises to interactively handle web pages during the conversations to enable them to share things in real-time. There are many uses cases documented in GSMA NG. 129.

In summary, the data channel capability provides the ability to establish a real-time communication path between two endpoints to exchange any form of data information, so long as the capabilities of both end points are compatible and agreed between them. This communication path can be in addition to voice and video. The format of the information carried across the data channel is transparent to the network, as long as it can be understood and interpreted by the end points involved in the session. More than one data channel can be established between the end points for different applications.

A mechanism via the bootstrap channel has been specified in 3GPP Release 16 TS 26.114 v. 16.0.0 to allow an application chosen by one UE to be distributed to both UEs in an IMS session. Other types of applications can be used in case the UE interacts with an enterprise.

SUMMARY

As part of developing embodiments herein one or more problems have been identified. As stated above, an IMS session triggers the Data channel server to handle the bootstrap data channel media, and a multimedia telephony service (MMTEL) is the entity that triggers the Data Channel server.

An object herein is to provide a mechanism to enable communication, for example, handle DC communication, in an efficient manner in a communication network.

Embodiments herein provide an architecture for controlling the media required for the Bootstrap media as well as other application data of a DC server.

According to an aspect the object is achieved by providing a method performed by a first network node, such as an IMS application server (AS), for handling an IMS session in a communication network. The first network node obtains data relating to bootstrapping of data channel information to the IMS session. The first network node reserves, at a second network node such as an enhanced media resource function (MRF) or an MRF, one or more needed media resources for bootstrapping data channel information to the IMS session. The first network node may then provide the second network node and/or the third network node, such as a DC server, with contact information and/or resource information required for bootstrapping the data channel information to the IMS session.

According to another aspect the object is achieved by providing a method performed by a second network node, such as an enhanced MRF or an MRF, for handling an IMS session in a communication network. The second network node receives from a first network node such as an IMS AS, a request for needed media resources for bootstrap data channel information to the IMS channel. The second network node responds to the first network node with a response indicating rejection or confirmation of one or more media resources reserved for the IMS session. The second network node may further obtain from the first network node contact information required for bootstrapping the data channel information to the IMS session.

According to yet another aspect the object is achieved by providing a method performed by a third network node, such as a DC server or a data channel server function (DCSF), for handling an IMS session in a communication network. The third network node receives contact information and/or resource information required for bootstrapping data channel information to the IMS session, wherein the resource information is related to one or more media resources reserved for the IMS session. The third network node may further obtain from the first network node contact information required for bootstrapping the data channel information to the IMS session.

According to yet another aspect the object is achieved by providing, a third network node, a second network node and a first network node configured to perform the methods herein, respectively.

Thus, according to yet another aspect the object is achieved by providing a first network node such as an IMS AS for handling an IMS session in a communication network. The first network node is configured to obtain data relating to bootstrapping of data channel information to the IMS session. The first network node is further configured to reserve, at a second network node such as an enhanced MRF or an MRF, one or more needed media resources for bootstrapping data channel information to the IMS session.

According to still another aspect the object is achieved by providing a second network node such as an enhanced MRF or an MRF, for handling an IMS session in a communication network. The second network node is configured to receive from a first network node such as an IMS AS, a request for needed media resources for bootstrap data channel information to the IMS channel. The second network node is further configured to respond to the first network node with a response indicating rejection or confirmation of one or more media resources reserved for the IMS session.

According to yet another aspect the object is achieved by providing a third network node, such as a DC server or DCSF, for handling an IMS session in a communication network. The third network node is configured to receive contact information and/or resource information required for bootstrapping data channel information to the IMS session, wherein the resource information is related to one or more media resources reserved for the IMS session.

It is furthermore provided herein a computer program product comprising instructions, which, when executed on at least one processor, cause the at least one processor to carry out the method above, as performed by the first network node, the second network node, and the third network node respectively. It is additionally provided herein a computer-readable storage medium, having stored thereon a computer program product comprising instructions which, when executed on at least one processor, cause the at least one processor to carry out the method according to the method above, as performed by the first network node, the second network node, and the third network node, respectively.

Thus, embodiments herein enable a communication, e.g., handle or manage IMS session comprising DC content delivery, in an efficient manner in a communication network.

BRIEF DESCRIPTION OF THE DRAWINGS

Embodiments will now be described in more detail in relation to the enclosed drawings, in which.

DETAILED DESCRIPTION

Figure 1:
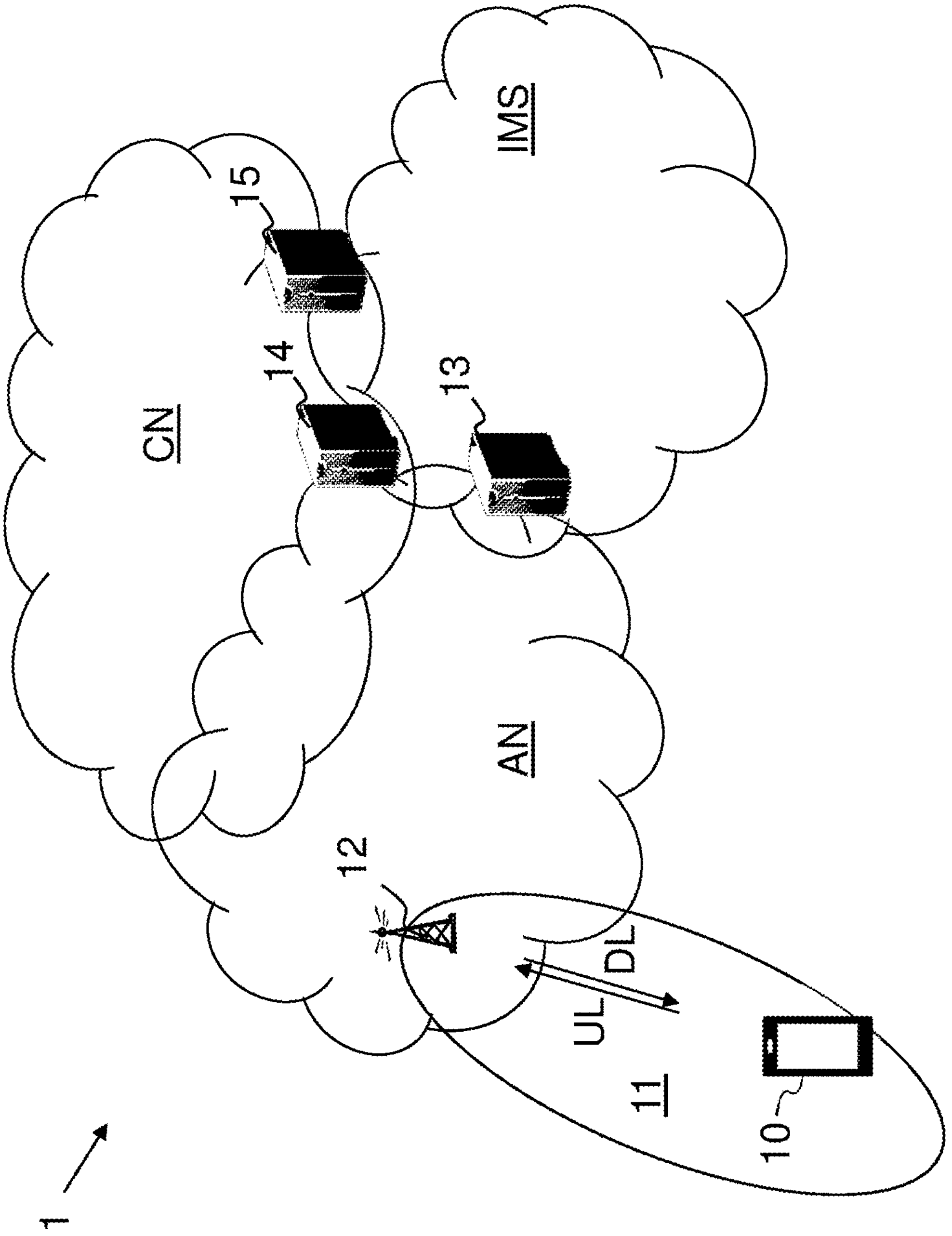
FIG. 1 shows an overview depicting a communication network according to embodiments herein.

Embodiments herein relate to communication networks in general. FIG. 1 is a schematic overview depicting a communication network 1. The communication network 1 comprises one or more access networks such as RANs and one or more CNs. The communication network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the communication network 1, a UE 10 such as a mobile station, a wireless device, a non-access point (non-AP) STA, a STA, and/or a wireless terminal, is comprised communicating via e.g. one or more Access Networks (AN), e.g. RAN, to one or more core networks (CN). It should be understood by the skilled in the art that "UE" is a non-limiting term which means any terminal, wireless communications terminal, user equipment, Internet of things (IoT) capable device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The communication network 1 comprises one or more radio network nodes 12 such as e.g. an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a stand-alone access point or any other network unit or node capable of communicating with a UE within a service area served by the radio network node depending e.g. on a first radio access technology and terminology used. The one or more radio network nodes may also be referred to as serving or source node or RAN node. It should be noted that a service area of a radio network node may be denoted as cell, beam, beam group or similar to define an area of radio coverage.

The communication network 1 provides IMS services, such as voice over LTE (VOLTE), VoNR, or similar, and comprises a first network node 13, a second network node 14, and a third network node 15 of an IMS. The first network node 13 may be a IMS application server (AS), and the second network node 14 may be an MRF or an enhanced MRF. The third network node 15 may for example be a DC server, also referred to as DCSF or any node controlling an enhanced MRF. Thus, the network nodes may be related to an IMS session. A MRF may be used by one or more IMS Application Servers (AS) to provide media plane processing independent of application types, e.g. transcoding, multiparty conferencing, network announcements/tones, etc. under the control of the IMS Application Servers.

Embodiments herein relate to handling an IMS session between UEs such as the UE 10 in the communication network 1. The first network node 13, such as an IMS AS, obtains data relating to bootstrapping of data channel information to an IMS session. For example, the first network node 13 may query, e.g., sending a real query or reporting an event, the third network node 15 whether there is DC content for the IMS session, and/or the first network node 13 may obtain information regarding capability of supporting DC content of one or more UEs. The first network node 13 then reserves one or more media resources at the second network node 14. The first network node 13 may then provide resource information and/or contract information to the third network node 15. The third network node 15 may then perform bootstrapping of DC content in the IMS session using the contact information and/or the resource information. It is further disclosed here how to tear down the IMS session and also how to add DC content to an already established IMS session.

Figure 2:
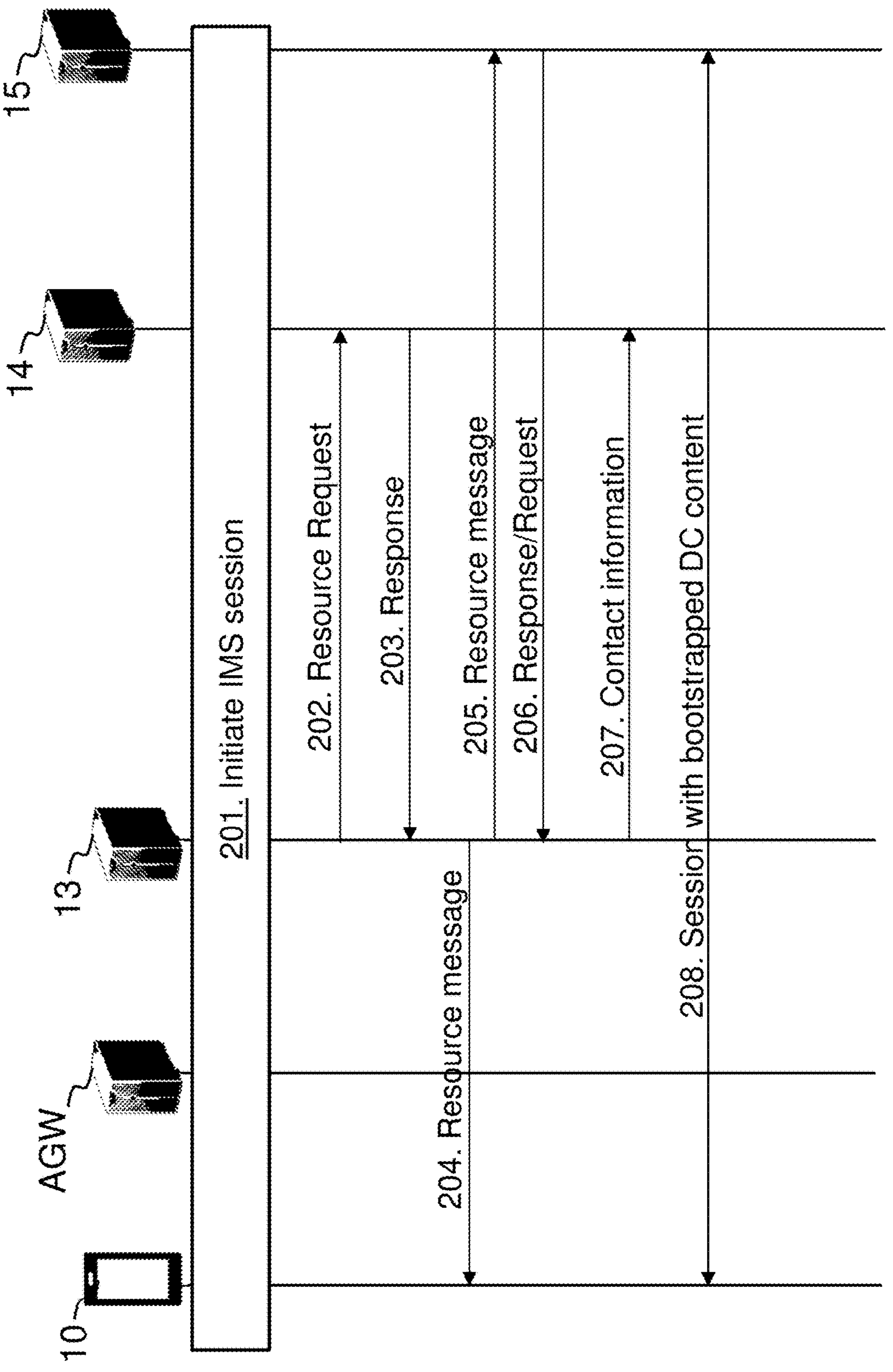
FIG. 2 shows a combined signalling scheme and flowchart depicting embodiments herein.

FIG. 2 shows a combined flowchart and signalling scheme according to some embodiments herein. The actions do not have to be taken in the order stated below.

Action 201. The UE 10 may initiate an IMS session or the IMS session may be established. The first network node 13 may receive an indication that DC media stream may be involved in the IMS session. For example, receive a real query or a report of an event. The first network node 13 may then further determine whether one or more UEs in the IMS session support DC content communication, i.e., support for the DC feature.

Action 202. The first network node 13 requests needed one or more media resources from the second network node 14. For example, the first network node 13 may transmit a request to the second network node 14 for one or more media resources for bootstrapping DC information to the IMS session. The second network node 14 may be an MRF or an enhanced MRF, e.g., transparent media proxying function, conferencing, etc. For bootstrapping the second network node 14 may reserve a media proxying function, forwarding the media content using ingress and/or egress ports/nodes.

Action 203. The second network node 14 may respond to the request with a rejection or a confirmation confirming one or more media resources needed for the bootstrapping of the DC information to the IMS session.

Action 204. The first network node 13 may then provide the IMS media plane and UE 10 with resource information, in a resource message, required for bootstrapping the data channel information to the IMS session using the second network node 14.

Action 205. The first network node 13 may then provide the third network node 15 with contact information and/or resource information, in a resource message, required for bootstrapping the data channel information to the IMS session. The first network node 13 may transmit a bootstrap message such as a request comprising indication of contact information of the one or more UEs in the IMS session, and/or indication of resource information relating to the reserved media resource information such as MRF Egress information for Bootstrap data.

Action 206. The third network node 15 may respond back to the first network node 13 comprising contact information of the third network node such as the DC Server Bootstrapping addressing Information or DCSF ingress Information. It should be noted that this DC Server Bootstrapping addressing Information or the DCSF ingress Information may alternatively be requested by the first network node 13. Alternatively, the third network node 15 may transmit a request with the contact information in a separate subsequent request or in another request.

Action 207. The first network node 13 may then update the second network node 14 with needed contact information for the DC server media Bootstrapping addressing information or DCSF ingress Information to be used by the second network node 14.

Action 208. The bootstrapped DC content may then be communicated between the UEs.

Figure 3:
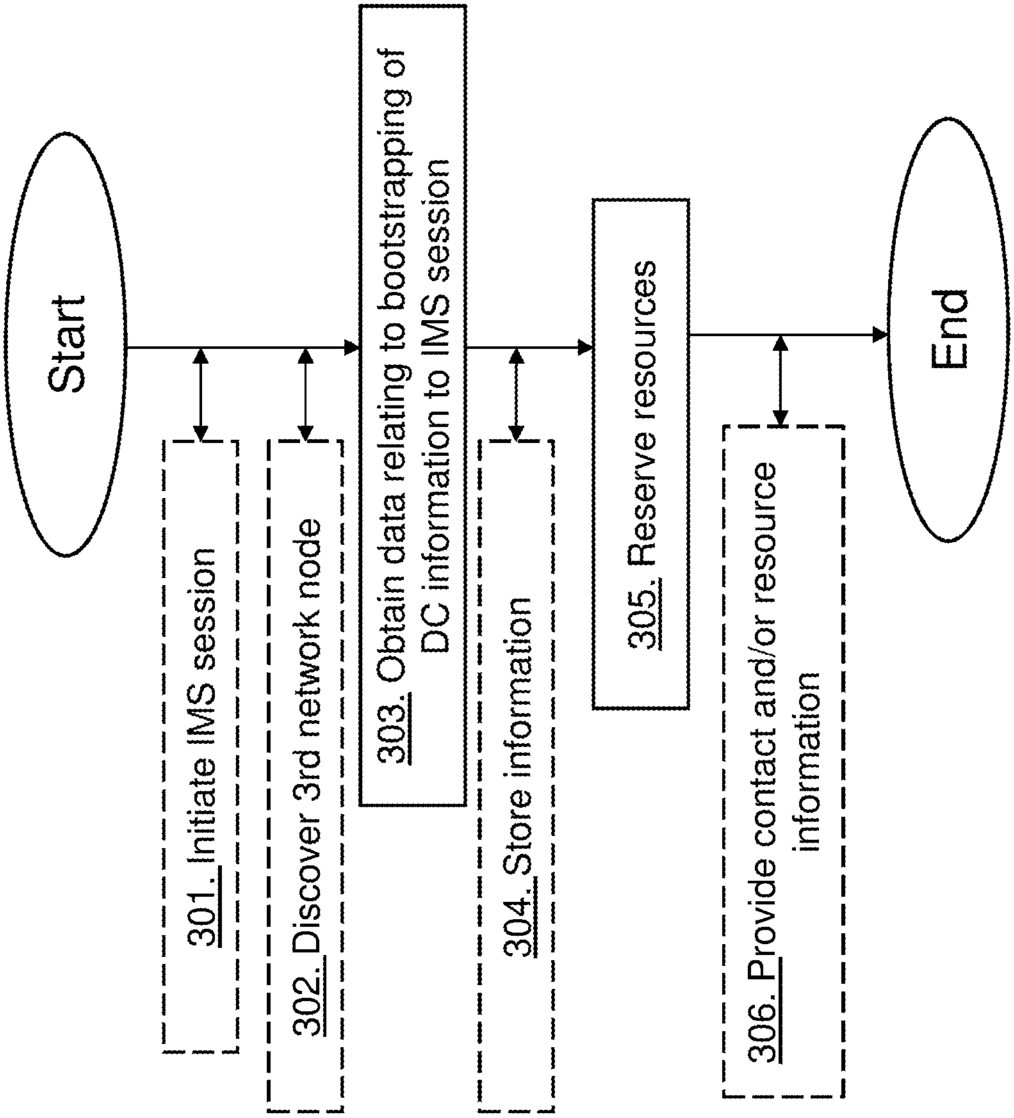
FIG. 3 shows a flowchart illustrating a method performed by a first network node according to embodiments herein.

The method actions performed by the first network node 13, such as a IMS AS, for handling the IMS session of one or more UEs in the communication network 1 according to embodiments herein will now be described with reference to a flowchart depicted in FIG. 3. The actions do not have to be taken in the order stated below. Dashed boxes indicate optional features.

Action 301. The first network node 13 may take part during the IMS session initiation.

Action 302. The first network node 13 may discover the third network node 15 for the IMS session.

Action 303. The first network node 13 obtains data relating to bootstrapping of data channel information to the IMS session. For example, the first network node 13 may query the third network node 15 whether there is DC content for the IMS session and receive a response, report an event, and/or the first network node 13 may obtain information regarding capability of supporting DC content of one or more UEs. The first network node 13 may initiate a request of type "Target" with the third network node 15 to verify if any of the participants in the IMS session has DC content that may require bootstrapping. Alternatively, the first network node 13 may already inform the third network node 15 of a registration event from a DC capable User. The message may contain capabilities for both device and subscriptions. The response may include success or confirmation if the UE 10 has content stored in the third network node 15. The third network node 15 may return information regarding performing the needed bootstrapping for entities engaged in IMS sessions. If there is a successful response then there is an implicit subscription by the third network node to the first network node 13 to be notified when the UE 10 is engaged in an IMS session with another target who is a DC user as well. The first network node 13 may initiate a request or query with the third network node 15 to verify if any of the participants in the IMS session has DC content that may require bootstrapping. The request includes the UE(s) that are subject of the query. The request may also include a Session ID for correlation purposes.

Action 304. The first network node 13 may then store (indication of) information from the response and/or regarding the capability. The first network node 13 may store the response which is bound to the ongoing IMS session.

Action 305. The first network node 13 reserves the needed one or more media resources for anchoring the bootstrap data at the second network node 14 such as the enhanced MRF or MRF. The first network node 13 may transmit a request to the second network node 14 to reserve media resources. The first network node 13 may then receive a response from the second network node 14 indicating rejection or confirmation, and may further indicate resource information such as MRF egress information.

Action 306. The first network node 13 may further provide, to the second network node 14 and/or the third network node 15, contact information relating to the IMS session, e.g. address information, IP information, and/or UE information, and/or resource information required for bootstrapping the data channel information to the IMS session. For example, the IMS AS 13 may update the DC server 15 with MRF egress information and the DC server 15 may respond back to the IMS AS 13 comprising contact information of the DC server such as the DC Server ingress Information, or the DC server may include contact information of the DC server such as the DC Server ingress Information in a separate subsequent request or in another request. Additionally or alternatively, the IMS AS 13 may update the media anchoring node MRF' or enhanced MRF with IP AGW (Access Gateway) Egress information and/or with the DC Server Bootstrapping Addressing information or DC server ingress Information.

Figure 4A:
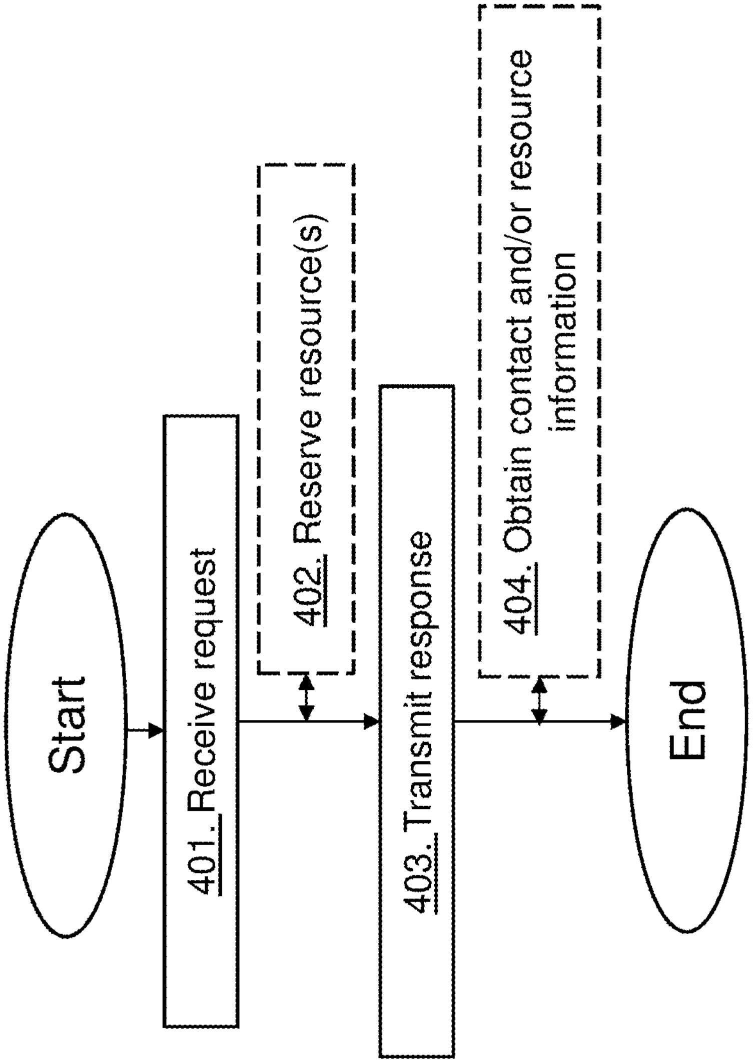
FIG. 4*a* shows a flowchart illustrating a method performed by a second network node according to embodiments herein.

The method actions performed by the second network node 14, such as an enhanced MRF or MRF node, for handling the IMS session of one or more UEs in the communication network 1 according to embodiments herein will now be described with reference to a flowchart depicted in FIG. 4*a*. The actions do not have to be taken in the order stated below, but may be taken in any suitable order. Dashed boxes indicate optional features.

Action 401. The second network node 14 receives a request from the first network node 13, indicating a need to reserve one or more media resources, such as media proxying capability, or conferencing, etc., for bootstrapping DC media information to the IMS session. Input parameters in the request may include one or more of the following: Session ID, Resource ID, Resource ID related Information. The request may comprise Egress and/or Ingress contact Information to be used by the second network node 14 for the related Media ID.

Action 402. The second network node 14 may then reserve resources and map a session ID to the reserved resources.

Action 403. The second network node 14 further transmits a response to the first network node 13. The response indicates rejection or confirmation of one or more media resources reserved for the IMS session. The response may comprise one or more of the following: indication of Success or Failure, Resource related information, e.g., the Egress information to be used by the Resource ID, or updated egress information.

Action 404. The second network node 14 may further obtain, from the first network node 13, contact information relating to the IMS session, e.g. address information, IP information, and/or UE information, and/or resource information required for bootstrapping the data channel information to the IMS session. For example, the IMS AS 13 may update the enhanced MRF 14 with IP AGW Egress information and/or with the DC Server ingress Information.

Figure 4B:
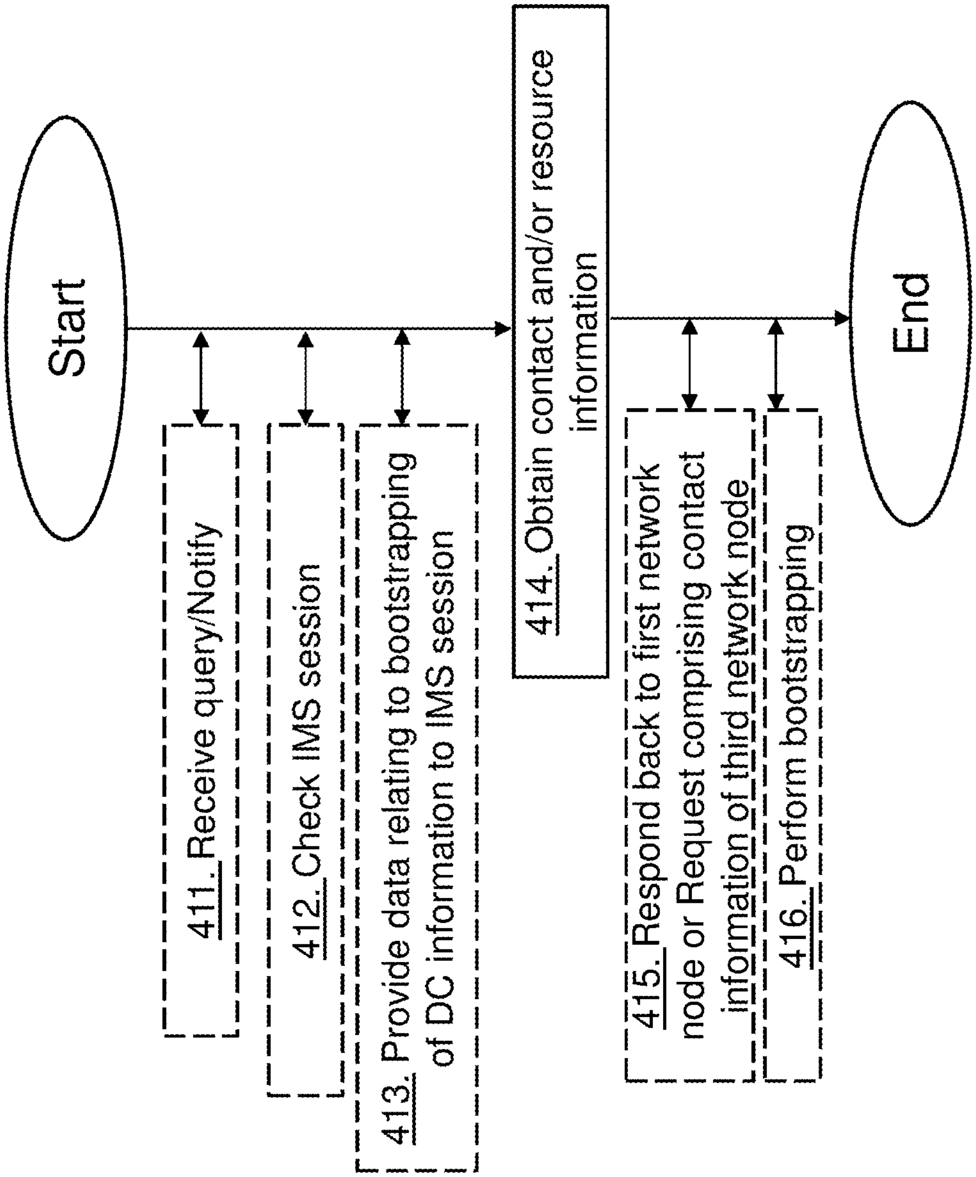
FIG. 4*b* shows a flowchart illustrating a method performed by a third network node according to embodiments herein.

The method actions performed by the third network node 15, such as a DC server or DCSF, for handling the IMS session of one or more UEs in the communication network 1 according to embodiments herein will now be described with reference to a flowchart depicted in FIG. 4*b*. The actions do not have to be taken in the order stated below, but may be taken in any suitable order. Dashed boxes indicate optional features.

Action 411. The third network node 15 may receive, from the first network node 13, a query whether there is DC content for the IMS session. For example, the third network node 15 may interact from the first network node to verify if any of the UEs in the IMS session has DC content that may require bootstrapping. A request may include the UE(s) that are subject of the query. The request may also include a Session ID for correlation purposes. Alternatively, the first network node 13 may already inform the third network node 15 of registration event from a DC capable User. The message may contain capabilities for both device and subscriptions. The response may include success or confirmation if the UE 10 has content stored in the third network node 15. If there is a successful response then there is an implicit subscription by the third network node to the first network node 13 to be notified when the UE 10 is engaged in an IMS session with another target who is a DC user as well.

Action 412. The third network node 15 may check the IMS session for DC content indication, for example, based on IMS Session targets.

Action 413. The third network node 15 may provide data relating to bootstrapping of data channel information to the IMS session. For example, the third network node 15 may respond to the first network node 13 with a response confirming DC content for any of the UEs in the IMS session or not.

Action 414. The third network node 15 obtains contact and/or resource information required for bootstrapping the data channel information to the IMS session, wherein the resource information is related to one or more media resources reserved for the IMS session. The first network node 13 may provide the third network node 15 with the enhanced MRF Egress information, such as address, for Bootstrap data as an example.

Action 415. The third network node 15 may respond back to the first network node 13 comprising contact information of the third network node such as the DC Server ingress Information, DC server Bootstrapping addressing information, or the third network node 15 may include contact information of the third network node 15 such as the DC Server ingress Information in a separate subsequent request or in another request.

Action 416. The third network node 15 may then perform bootstrapping of DC content in the IMS session based on the contact and/or resource information.

According to some embodiments herein, when an IMS session is initiated by the UE 10 and the UE 10 has indicated support for the DC feature, the IMS AS 13 queries the DC Server 15 to know if there is content associated with either the calling UE, called UE, or both. The DC server 15 responds accordingly. Alternatively, the IMS AS 13 may already inform the DC server 15 of, for example, a registration event from a DC capable User. The message may contain capabilities for both device and subscriptions. The response includes success or confirmation if the UE has content stored in the DC server 15. If there is a successful response then there is an implicit subscription by the DC server 15 to the IMS AS 13 to be notified when the UE 10 is engaged in an IMS session with another target who is a DC user as well.

If the DC server 15 responds that indeed there is content associated with either or both of the parties in the ongoing IMS session and that may require bootstrapping, the IMS AS 13 may store this information for later use and associates it with the ongoing IMS session.

When the IMS session is established and both sides indicate support for the DC feature, the IMS AS 13 conveys the needed connectivity information to the DC server 15 to enable bootstrapping of the parties in the IMS session.

As a variant for the above procedure, the IMS AS can undergo both of the above actions after the IMS session has been established and both parties support the IMS DC feature.

The actual methods for creating the content, and everything associated with is not explained in detail herein.

Additionally, whether the UE 10 requires a subscription for the IMS feature is an operator policy.

In this solution, a new MRF, called MRF' or enhanced MRF 14, is enhanced to support the IMS DC feature.

To provide the DC server 15 with the enhanced MRF Egress information for Bootstrap data as an example, as well as receive the DC server bootstrapping addressing, i.e. ingress, information, the IMS AS 13 interacts with the DC server 15 for that purpose.

Note: IMS AS 13 has already discovered the DC server 15 and established interaction with the DC server 15 during IMS session setup.

IMS AS 13 is the only consumer of enhanced MRF 14. Interaction between IMS AS 13 and enhanced MRF 14 occurs with an IMS DC related session.

Figure 4C:
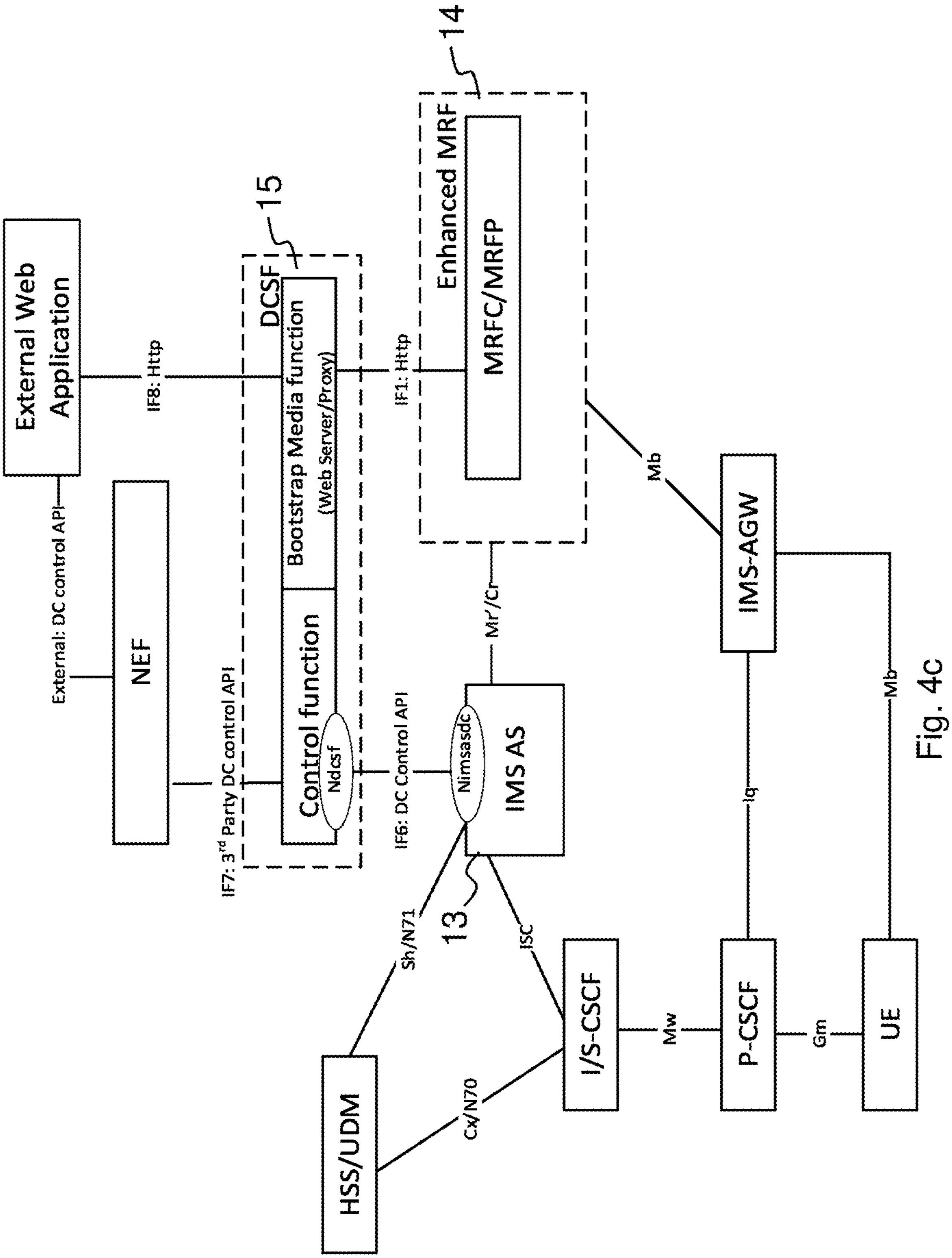
FIG. 4*c* shows a block diagram depicting a communication network according to embodiments herein.

FIG. 4*c* depicts a high level architecture diagram for the enhanced MRF solution showing the architecture of the IMS for supporting the IMS Data Channel feature, illustrating the interworking between IMS and other entities needed to support DC feature in this option.

In this architecture, the IMS MRF is enhanced to support additional functionality related to Data Channel server (DC server) while maintaining backward compatibility, and reusability. MRFs that are expected to support DC feature shall be enhanced for that purpose.

NOTE: Not all deployed MRFs needs to be enhanced to support DC feature

FIG. 4*c* includes the following interfaces:

- IF1 between the enhanced MRF and DCSF for media transport related to bootstrapping and application data. What is transported over IF1 is only relevant to the UE. IF1 is HTTP based. IMS is transparent at the application level.
- IF6 between the IMS AS and DCSF for managing DC feature related to IMS channel including media control. This interface hast to be extensible and support vendor specific information with no impact on interoperability. IF6 is service based.
- IF7 between the IMS DCSF and the NEF.
- IF8 between third party AS and the Operator IT network, where it is assumed the DCSF is hosted. The interface has to be extensible and support vendor specific elements.
- DCSF includes the DC store
- MRF includes MRFC/MRFP
  - IF1, IF6, IF7 are in scope of the TR. IF7 is out of Release 18.
  - IF8 is out of scope of the TR.
  - Nimsasdc implements services supported by the IMS AS.
  - Ndcsf implements services supported by the DCSF.

Figure 5:
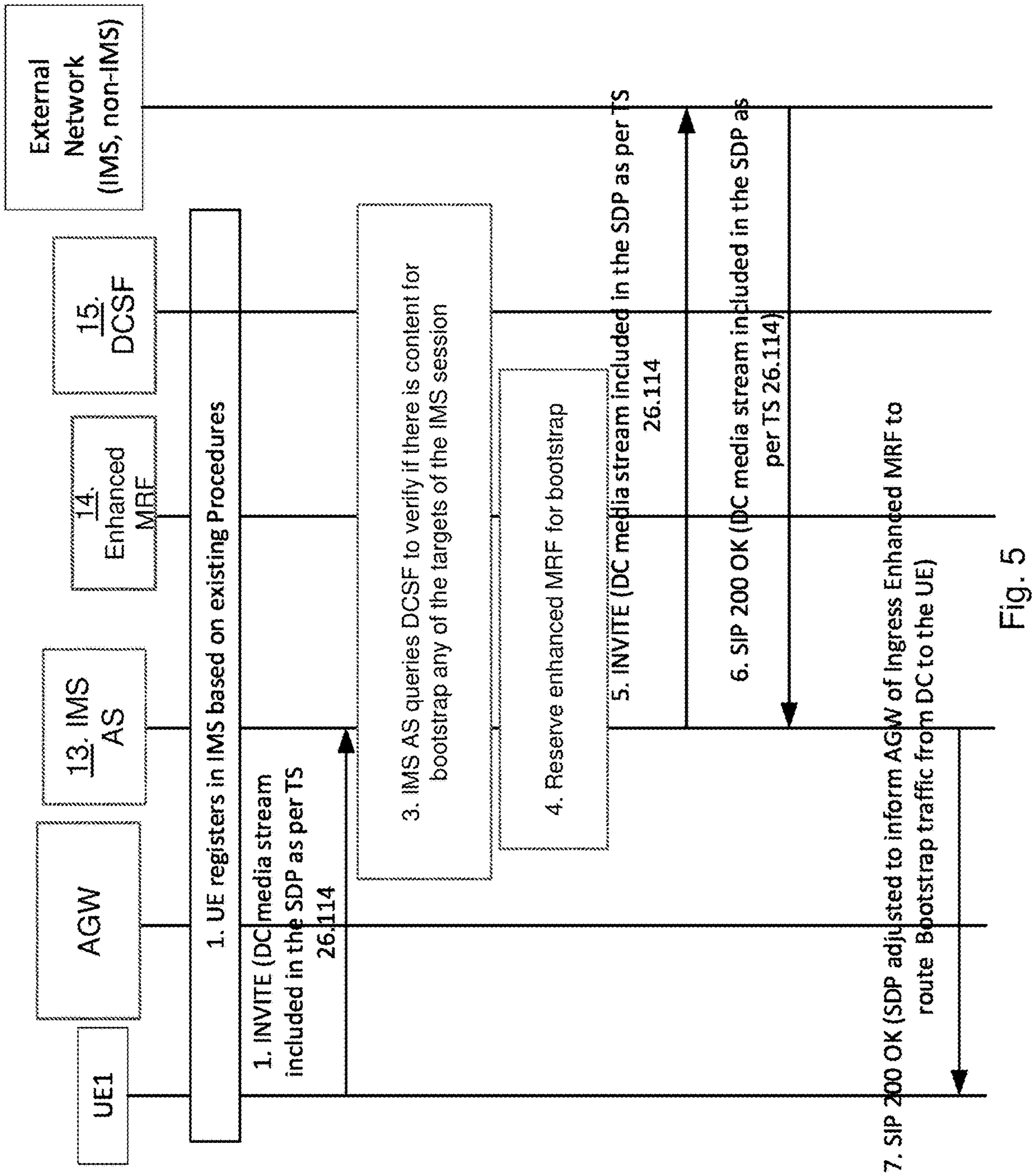
FIG. 5 shows a combined signalling scheme and flowcharts depicting embodiments herein.
Figure 6:
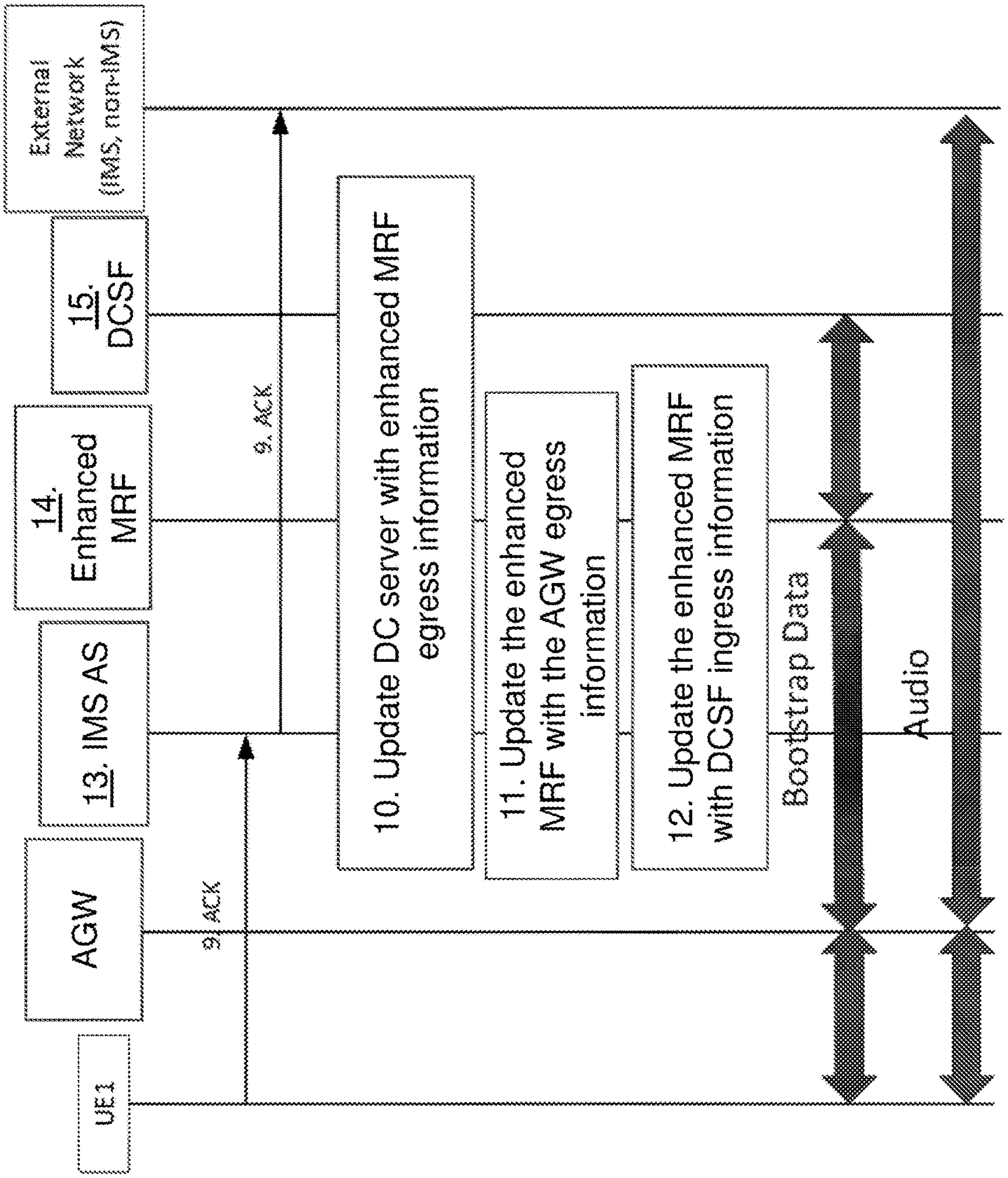
FIG. 6 shows a combined signalling scheme and flowchart depicting embodiments herein.

The call flows in FIGS. 5-6 illustrate the various interactions within an IMS DC related session related to the DC feature. Interactions triggered by UEs related to the actual initiation of the bootstrapping are not included.

The following is a brief description of the actions in the call flow:

In action1, UE registers in IMS after successfully establishing an IMS PDU session.

In action 2, UE initiates an IMS session, and indicates support for the IMS DC feature in the SDP as per TS 26.114. It is assumed that the network also supports the IMS DC feature.

In action 3, the IMS AS initiates a request of type "Target Query" or an interaction with the IMS DCSF to verify if any of the participants in the IMS session has DC content that may require bootstrapping. The Request or the Interaction includes sending to the DCSF the IMS targets that are subject of the query. This action can also be postponed till after action 9.

In action 4, the IMS AS reserves or engages the enhanced MRF for the needed media resources for anchoring the bootstrap data. This action can also be performed after action 6.

In actions 5-6, the session establishment procedure is successfully completed based on existing procedures. It is assumed in this call flow that both; originating and terminating UE support the IMS DC feature.

In action 7, the IMS AS updates the SDP towards the UE so that the IMS AGW is updated with the media anchoring MRF Ingress information related to the bootstrap data. For example, if the IMS AS already reserved the media resources in MRF' for the bootstrap data, the IMS AS updates the SDP towards the UE.

In action 9, the SIP ACK is sent to the target.

In action 10 DC Server or DCSF 15 is updated with the enhanced MRF Egress information for the Bootstrap data. A response to the IMS AS 13 may include the DC Server Bootstrapping addressing Information to be used by the MRF' 14.

In action 11, IMS AS 13 updates the media anchoring node enhanced MRF 14 with the IP AGW Egress information.

In action 12, IMS AS 13 may update the enhanced MRF 14 with the DC server ingress information or DC server Bootstrapping addressing information.

As can be seen the Bootstrap data traverses through enhanced MRF, while the actual voice media bypasses the enhanced MRF.

DC Server or DCSF Services.

The table below highlights the services to be supported by the DCSF. The subsequent sections depict how these services are used as examples:

| Service Name | Service Operations | Operation Semantics | Example Consumer(s) | Comments |
|---|---|---|---|---|
| Ndcsf_Session | Query | Request/Response | IMS AS | Input parameters includes the Session ID, one or more TargetID (s) in the IMS session. Expected output parameter is Success or Failure. Success means that at least one target requires bootstrapping. Failure means that no target needs any bootstrapping |
| | Release | Request/Response | IMS AS | Input parameters includes the Session ID. Expected output parameter is Success or Failure. |
| Ndcsf_Media | Update | Request/Response | IMS AS | This service enables a request to be sent to the DCSF to update the DCSF with Egress media information for media associated with an IMS Target. Input parameters include the Session ID, IMS TargetID, Media Type, Resource ID. Resource ID includes an identity for the used resource and the addressing information. Optional parameters include Media purpose (e.g. Bootstrap), ResourceIDContainer. ResourceIDContainer depends on the media type. Expected output parameter is Success or Failure. |
| | Release | Request/Response | IMS AS | This service enables a request to be sent to the DCSF to remove Egress media information for media associated with an IMS Target. Input parameters includes |

-continued

| Service Name | Service Operations | Operation Semantics | Example Consumer(s) | Comments |
|---|---|---|---|---|
| | | | | the Session ID, ResourceID.Media Type. Expected output parameter is Success or Failure. |
| Ndcsf_EventExposure | Subscribe Unsubscribe Notify | Subscribe/Notify | FFS | FFS |

Every Resource ID reserved for any purpose within the same IMS session and for a media type must be unique. Media Types used for different medias within a single IMS session must be unique. Every media is allocated a unique Media Type by the NF that initiates the request for such media within the same IMS session. Additionally, Media Type used by the IMS AS and DCSF must be identical for same media related Request/Responses in the same IMS session. This enables both ends to bind the allocated resources with the Media Type for every Media Type supported in the same IMS session, as an example: An IMS session has bootstrapping media type and data application media type: The following information can be maintained at both the IMS AS and DCSF:

| NF | Media Type | Resources IDs | IMS Session ID |
|---|---|---|---|
| IMS AS | Bootstrap media | Res1, Res. 2 | Session 1 |
| DCSF | Bootstrap media | Res1, Res. 2 | Session 1 |

-continued

| NF | Media Type | Resources IDs | IMS Session ID |
|---|---|---|---|
| IMS AS | Data Application 1 | Re3, Res. 4 | Session 1 |
| DCSF | Data Application 1 | Res3, Res. 4 | Session 1 |

The section below depicts examples on how these services are invoked individually within the context of the main IMS session procedure in section above Alternative Option for the IMS Initiating the Ndcsf_Session_Query.

In another option for ensuring that the query is indeed associated with a UE who has content in the DCSF is to implement a new service in DCSF. This service is defined below:

| Service Name | Service Operations | Operation Semantics | Example Consumer(s) | Comment |
|---|---|---|---|---|
| Ndcsf_User_Registration | Notify | Request/Response | IMS AS | Informs DC server of registration event from a DC capable User. Contains capabilities for both device and subscriptions. The response includes success if the UE has content stored in the DC server. If there is a successful response then there is an implicit subscription by the DC server to the IMS AS to be notified when the UE is engaged in an IMS session with another target who is a DC user as well. |

This new service ensures that a query to the DC server later has indeed an associated content. This would be an optimization.

Alternatively or additionally, 6.X.2.2 MRF' Services

The Table below illustrates main services provided by MRF'.

Editors Note: The parameter names are subject to change to be generic, and are for further study (FFS).

Editors Note: Additional parameters as we as the optionality are FFS.

| Service Name | Service Operations | Operation Semantics | Example Consumer(s) | Comments |
|---|---|---|---|---|
| Nmrf'_Session | Reserve | Request/Response | IMS AS | Input parameters includes the Session ID, Resource ID, Resource ID related Information. Expected output parameter is Success or Failure, as well as Resource related information e.g the Egress information to be used by the Resource ID. |
| | Update | Request/Response | IMS AS | Input parameters include the Session ID, Resource ID, and Resource ID related information, e.g the Egress/Ingress contact Information to be used by the MRF' for the related Media ID Expected output parameter is Success or Failure, as well as Resource ID related Information. |
| | Release | Request/Response | IMS AS | Input parameters includes the Session ID, and Resource ID. The absence of Resource ID implies the release of all resources associated with the Session ID. Expected output parameter is Success or Failure. |
| Nmrf'_EventExposure | Subscribe Unsubscribe Notify | Subscribe/Notify | FFS | FFS |

Figure 7A:
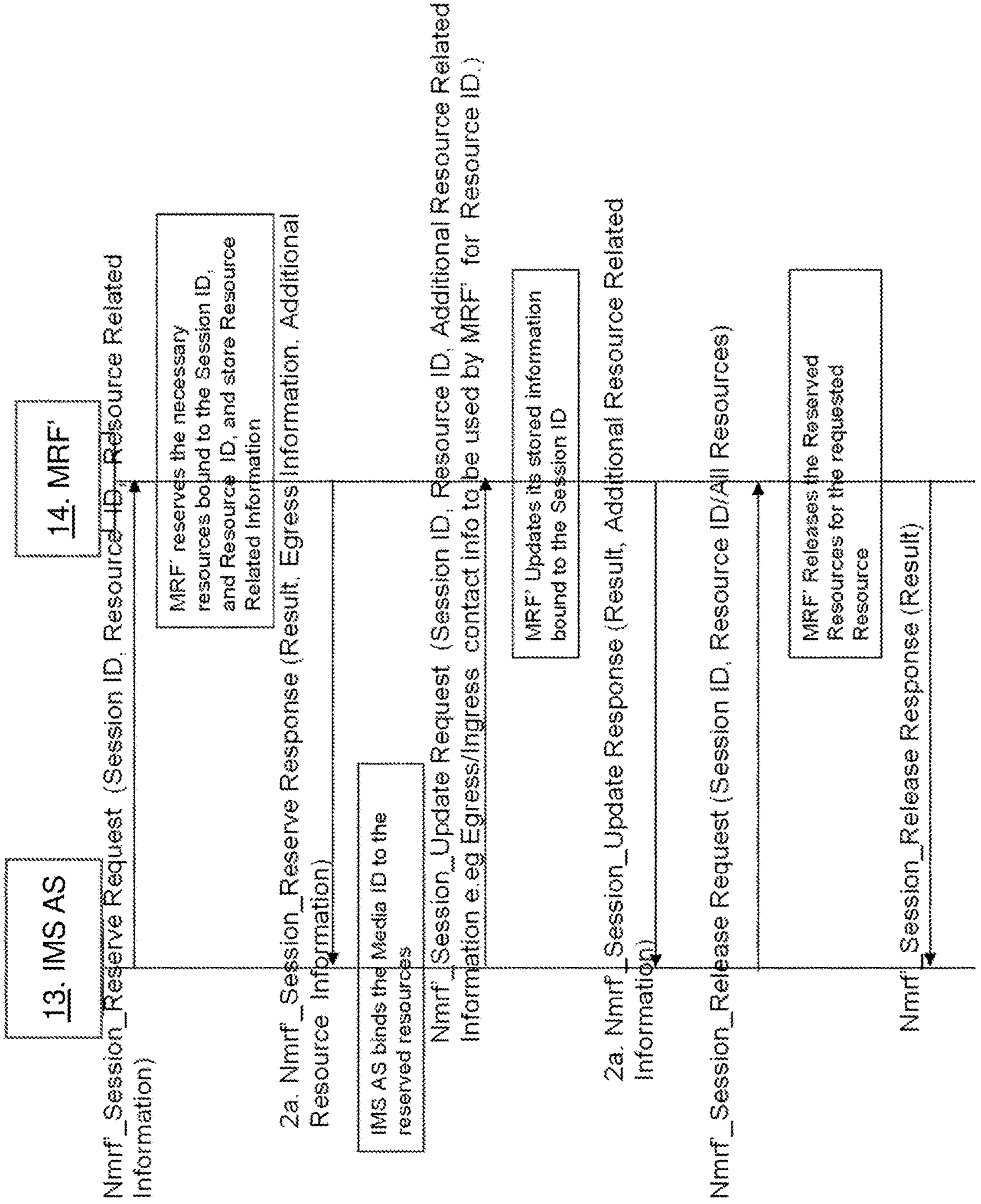
FIG. 7*a* shows a combined signalling scheme and flowchart depicting embodiments herein.

The procedure in FIG. 7*a* may illustrate some interactions.

The first network node 13, i.e., the IMS AS 13 may transmit to the MRF' a Nmrf'_Reserve request comprising session ID, Resource ID, Resource related information. The MRF' 14 reserves the necessary resources bound to the session ID and resource ID and may store the resource related information. The MRF' 14 responds with a Nmrf'_session_reserve response comprising result, egress information, additional resource information. The IMS AS 13 may bind the media ID to the reserved resources.

The IMS AS may then send an update request such as a Nmrf'_session_Update request comprising e.g. session ID, resource ID, additional resource related information e.g. egress/ingress contact information to be used by the MRF' for resource ID. The MRF' 14 may update its stored information bound to the session ID. The MRF' 14 may then respond with a response such as a Nmrf'_Session_Update response comprising e.g. result, additional resource related information.

The IMS AS 13 may transmit to the MRF' 14 a release request such as a Nmrf'_Session_Release request comprising e.g. session ID, Resource ID or indicating all resources. The MRF' 14 may then release the reserved resources for the requested resource. The MRF' 14 may then respond with a response such as a Nmrf'_Session_Release Response comprising e.g. the result.

Figure 7B:
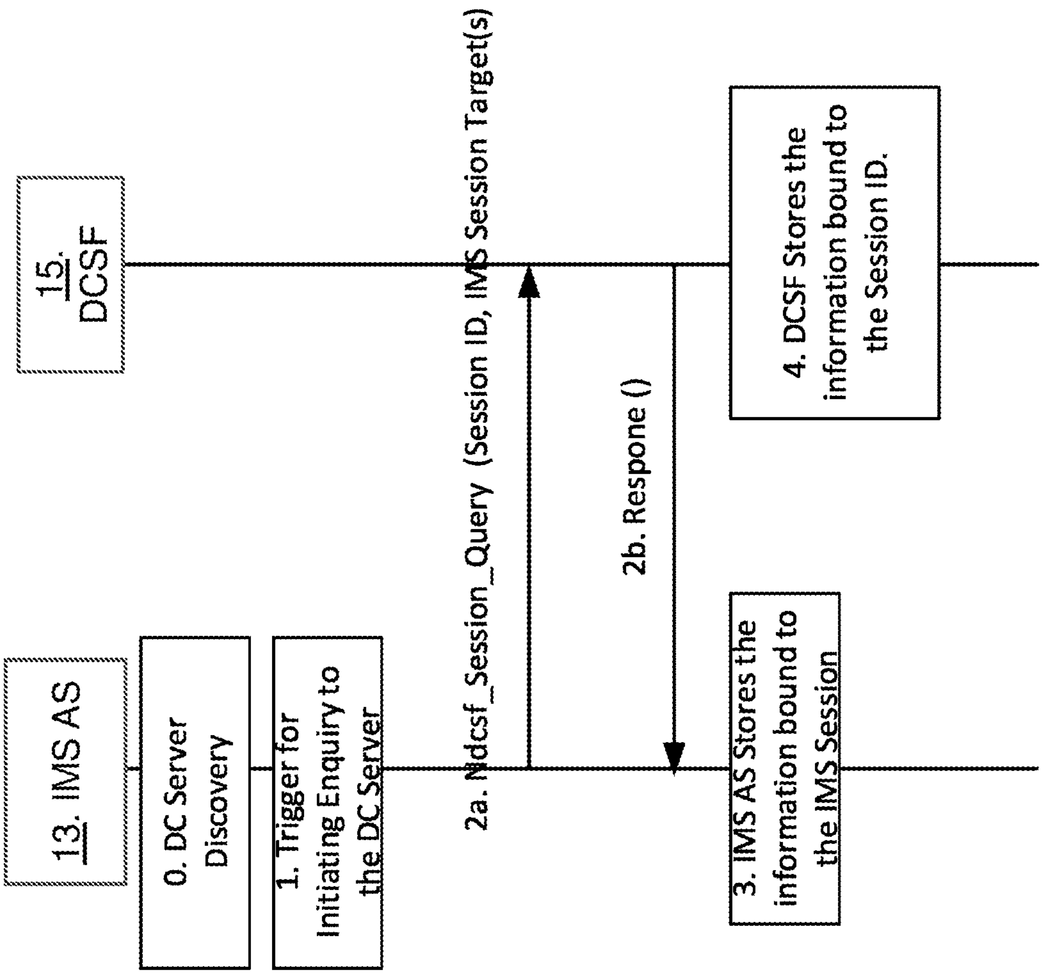
FIG. 7*b* shows a combined signalling scheme and flowchart depicting embodiments herein.

IMS Session Initiation Procedure:

The call flow below In FIG. 7*b* illustrates the interaction between the IMS AS 13 and DCSF to bootstrap needed information, where applicable, to IMS clients engaged in an IMS session and for which such bootstrapping is required.

FIG. 7*b* shows an IMS AS DC Interaction Framework-Session Initiation.

The event may be reported upon request, but may also be reported through notification events. The following is a brief description of the steps in the call flow:

Steps 0-3 correspond to step 3 in the call flow in FIG. 5

In step 0, IMS AS performs DC server discovery based on existing procedures in TS 23.502 [2].

In step 1, a trigger for initiating interaction with the DCSF is fulfilled. The trigger can be an originating/terminating session with the DC feature for an IMS session where the two parties in the IMS session indicated support for the DC feature.

In step 2*a*, the IMS AS initiates a Ndcsf_Session_Query Request with the DCSF to verify if any of the participants in the IMS session has DC content that may require bootstrapping. The Request includes one or more of IMS target(s) Identity that are subject of the query. The Request also includes a Session ID for correlation purposes. The IMS receives a response in step 2*b*.

Editor's note: Additional information to be included in Request and response is FFS.

In step 3, IMS AS stores the response which is bound to the ongoing IMS session.

In step 4, DCSF stores the information related to the IMS session, This information is deleted when the DCSF receives a request to release the session.

Figure 7C:
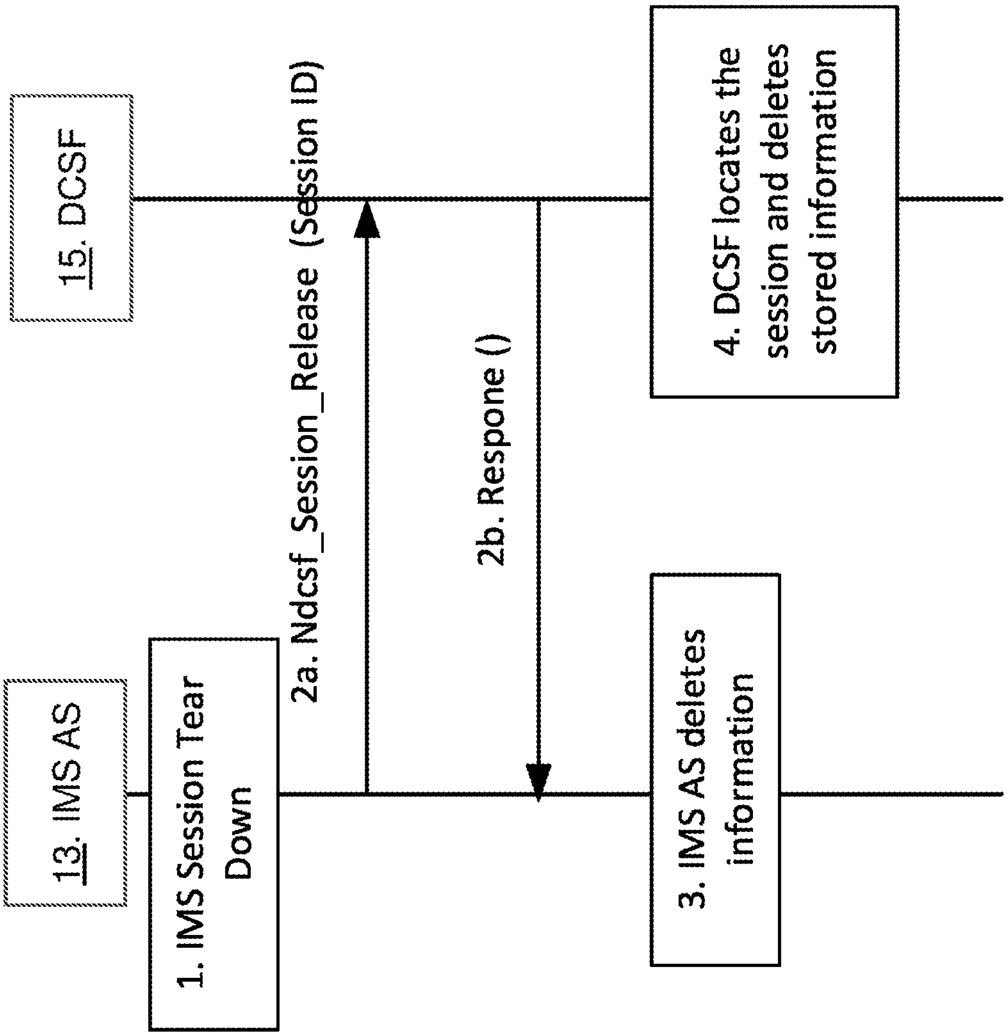
FIG. 7*c* shows a combined signalling scheme and flowchart depicting embodiments herein.

IMS Session Tear Down Procedure:

FIG. 7*c* shows an IMS AS DC Interaction Framework—Session Release.

The following is a brief description of the steps in the call flow:

In step1, IMS AS detects that an IMS session subject to DCSF bootstrapping is torn down.

In step 2*a*, the IMS AS initiates a Ndcsf_Session_Release Request to inform DCSF that a DC related IMS session has terminated. The Request also includes the Session ID. The IMS receives a response in step 2*b*.

Editor's note: Additional information to be included in Request and response are FFS.

In step 3, DCSF uses the Session ID to locate the target session stored information and deletes the stored state.

In step 4, IMS AS deletes the stated associated with the IMS session.

The IMS AS charging information includes information to indicate that the IMS session utilized the DC feature. The DCSF may also produce records to that effect.

IMS Session Modification Procedure.

When an ongoing IMS session that did not include the DC feature at session establishment, is later modified by either target in the IMS session to become an IMS session with DC feature successfully negotiated, the IMS AS performs identical to the steps taken at IMS session initiation in FIG. 7*b*.

IMS AS-DC Server Interaction for Media Control

Figure 8A:
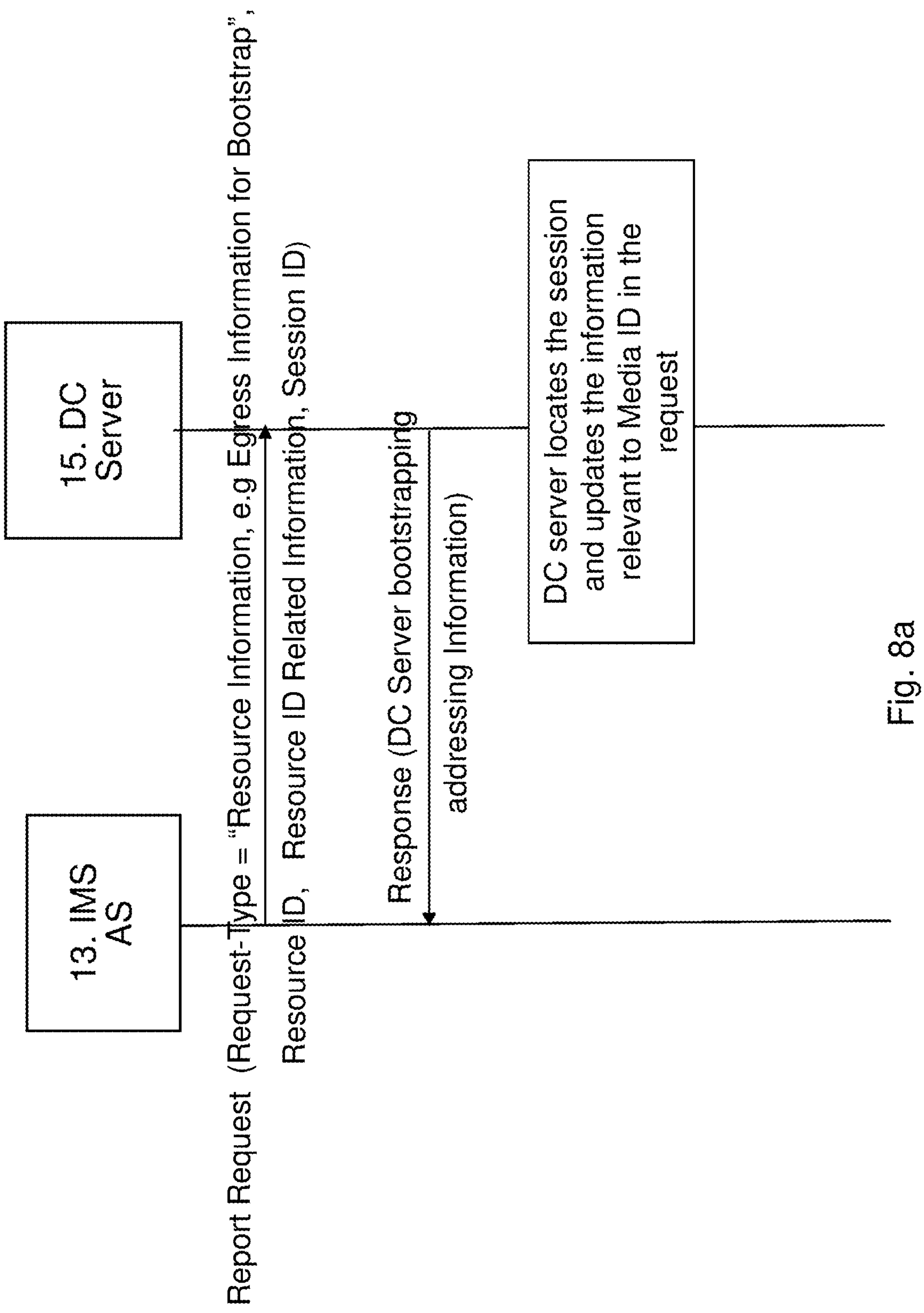
FIG. 8*a* shows a combined signalling scheme and flowchart depicting embodiments herein.

The procedure in FIG. 8*a* illustrates the interaction between the IMS AS 13 and DC server 15 in support of DC media.

Once the IMS AS 13 reserves the necessary resources in MRF' 14 for the media that has to be managed by the IMS session and the DC server, the IMS AS 13 may need to inform the DC Server 15 of the Egress information to be used for the media, and the relevant IMS session.

The IMS AS 13 uses the same media ID, corresponding to the one used for reserving the needed resources in the MRF' 14.

Editor's note: It is FFS if more than one Media ID can be used in a single request to the DC Server.

The IMS AS 13 may transmit a Report Request indicating, e.g., Request-Type="Resource Information, e.g., Egress Information for Bootstrap", Resource ID, Resource ID Related Information, session ID. The DC server 15 may respond with a response comprising e.g. DC Server Bootstrapping addressing Information. The DC server 15 may locate the session and update the information relevant to Media ID in the request.

It is also possible that there is a separate Request from the IMS AS 13 requesting the DC server 15 for the Bootstrapping Address as opposed to including the Bootstrapping Address information in the returned response.

IMS Media Update.

Once the IMS AS reserves the necessary resources in the enhanced MRF for the media that has to be managed by the IMS session and the DCSF, the IMS AS 13 may need to inform the DCSF of the Egress information to be used for the media. This corresponds to step 10 in FIG. 6. Subsequently, the DCSF informs the IMS AS of the DCSF ingress information. The enhanced MRF is then updated with this information, which corresponds to step 12 in FIG. 6.

Figure 8B:
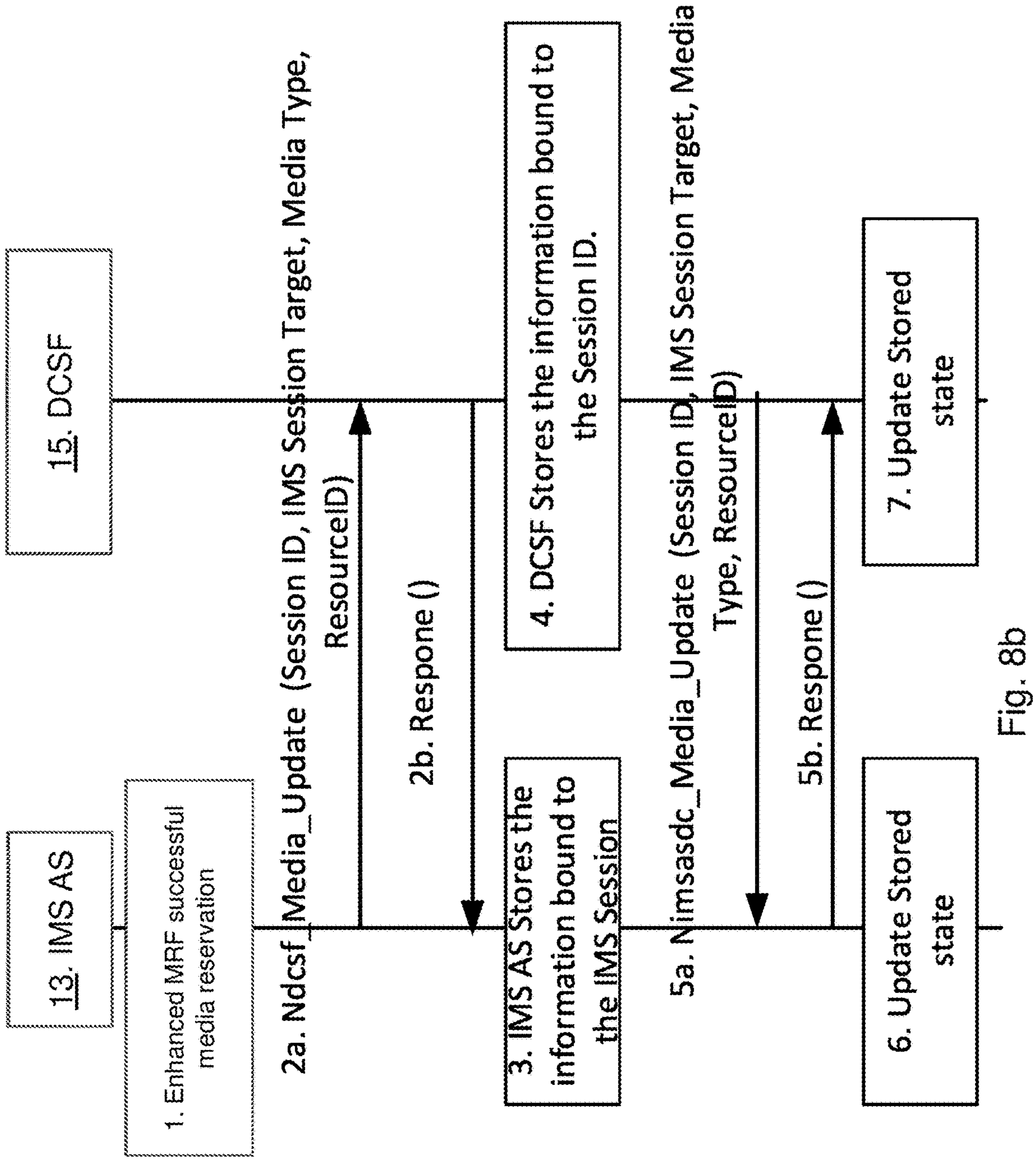
FIG. 8*b* shows a combined signalling scheme and flowcharts depicting embodiments herein.

FIG. 8*b* shows an IMS AS DC Interaction Framework—Media Update.

In step 1, IMS successfully reserved the needed resources in the enhanced MRF, or updated the reserved resources due to some reason.

In step 2*a*, IMS AS initiates an Ndcsf_Media_Update Request to the DCSF. The Request includes the IMS target contact information for bootstrapping purposes as an example, and necessary media related information. The IMS receives a response in step 2*b*.

In step 3, IMS AS stores the information for later use.

In step 4, DCSF updates the information related to the IMS session.

In step 5*a*, DCSF initiates an Nimsasdc_Media_Update Request to the IMS AS. The Request includes the IMS target contact information for bootstrapping purposes as an example, and the necessary media related information. The IMS receives a response in step 5*b*.

In steps 6, and 7, IMS AS and DCSF updates their states respectively with the information.

IMS AS Services

The table below highlights the services to be supported by the IMS AS. The subsequent sections depict how these services are used:

| Service Name | Service Operations | Operation Semantics | Example Consumer(s) | Comments |
|---|---|---|---|---|
| Nimsasdc_Media | Reserve | Request/Response | DCSF | This service enables a request to be sent to the IMS AS to reserve media associated with an IMS Target and required by the DCSF. Input parameters include the Session ID, IMS TargetID, Media Type, Resource ID. In this case the resource ID includes only an identity. Optional Parameter includes Media purpose (e.g. Bootstrap), ResourceIDContainer. Expected output parameter is Success or Failure. |
| | Update | Request/Response | DC Server | This service enables a request to be sent to the IMS AS to update the IMS AS with Ingress media information associated with an IMS Target. Input parameters include the Session ID, IMS TargetID, Media Type, Resource ID. In this case Resource ID includes an identity for the used resource and the addressing information. Optional parameters |

-continued

| Service Name | Service Operations | Operation Semantics | Example Consumer(s) | Comments |
|---|---|---|---|---|
| | | | | include Media purpose, ResourceIDContainer. Expected output parameter is Success or Failure. |
| | Release | Request/Response | DC Server | This service enables a request to be sent to the IMS AS to release a previous resource reserved for an IMS TargetID. Input parameters include the Session ID, IMS TargetID, Resource ID. Expected output parameter is Success or Failure. |
| Ndcsf_EventExposure | Subscribe Unsubscribe Notify | Subscribe/Notify | FFS | FFS |

Properties related to Media Type, Resource ID are identical to what is described in clause above.

Finally, the IMS session initiation procedure in Figures are repeated now with the service based procedures between the IMS AS and DCSF introduced in FIG. 8*b*.

Figure 9A:
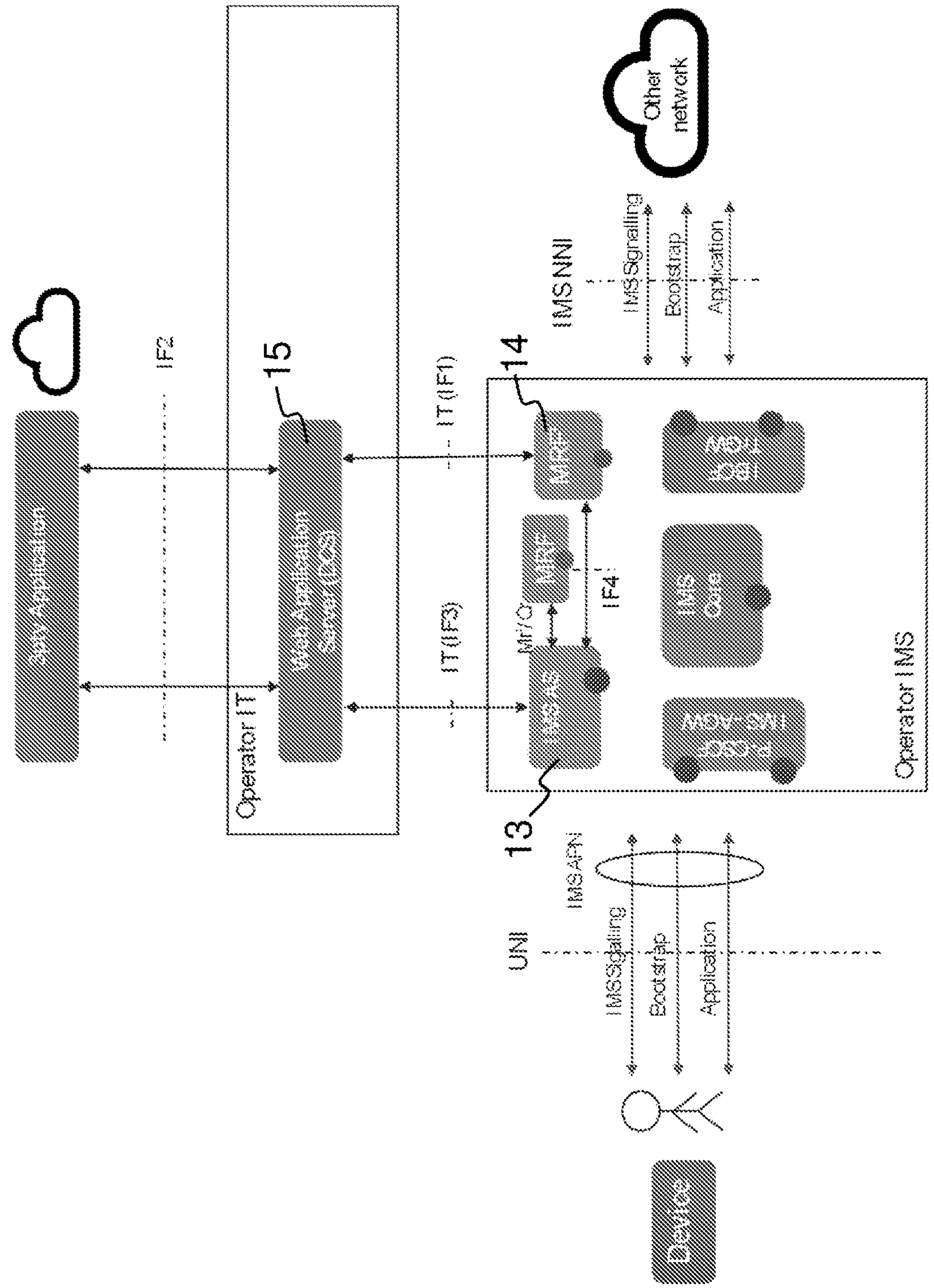
FIG. 9*a* shows a block diagram depicting a communication network according to embodiments herein.

FIG. 9*a* depicts a high level architecture diagram showing the architecture of the IMS for supporting the IMS Data Channel feature, illustrating the interworking between IMS and other entities needed to support DC feature.

In this architecture, the IMS MRF can be enhanced to support additional functionality related to DC server while maintaining backward compatibility.

The IMS MRF' is a new service based MRF for the purpose of interaction with the Web Server, and the IMS AS.

The Figure includes as well the following interfaces:

IF1 between the MRF' and DC server for media transport related to bootstrapping and application data.

IF2 between third party AS and the Operator IT network, where it is assumed the DC server is hosted.

IF3 between the IMS AS and DC server for managing DC feature related to IMS channel including media control.

IF4 between the IMS AS and the

Figure 9C:
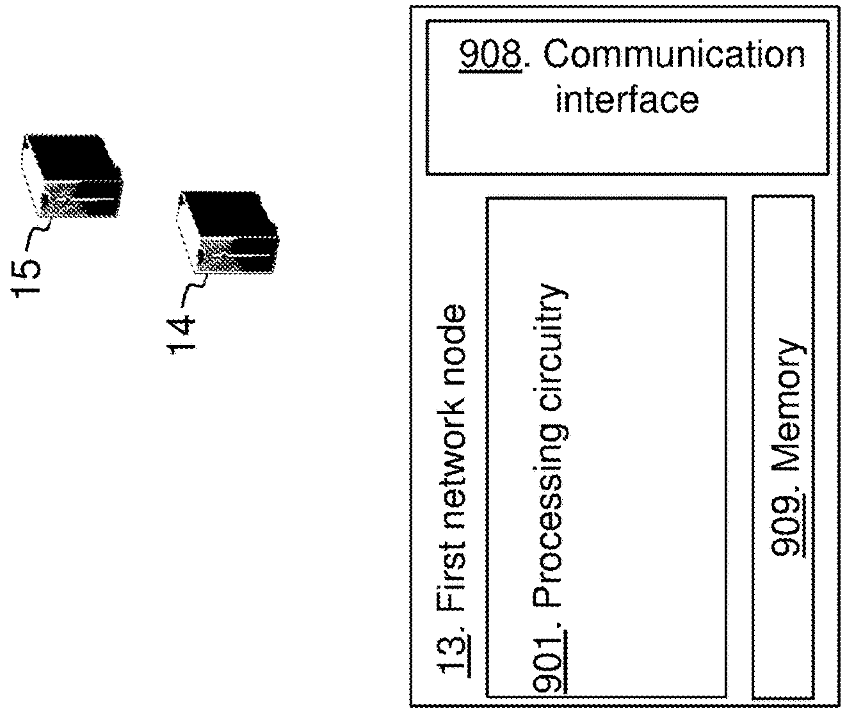
FIGS. 9*b*-9*c* show block diagrams depicting embodiments of a first network node according to embodiments herein.
Figure 9B:
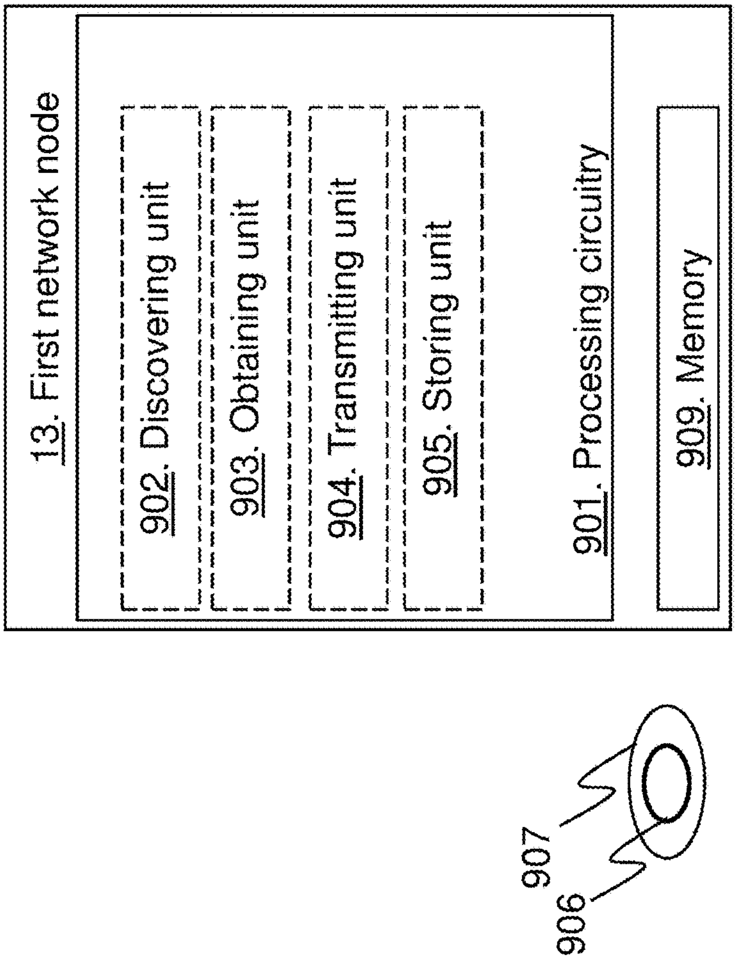

FIGS. 9*b*-9*c* are block diagrams depicting the first network node 13 such as an IMS AS, for handling the IMS session of one or more Ues in the communication network 1 according to embodiments herein.

The first network node 13 may comprise processing circuitry 901, e.g., one or more processors, configured to perform the methods herein.

The first network node 13 may comprise a discovering unit 902. The first network node 13, the processing circuitry 901, and/or the discovering unit 902 may be configured to discover the second network node 14 for the IMS session.

The first network node 13 may comprise an obtaining unit 903, e.g. a receiver or a transceiver. The first network node 13, the processing circuitry 901, and/or the receiving unit 903 is configured to obtain data relating to bootstrapping of data channel information to the IMS session. For example, the first network node 13, the processing circuitry 901, and/or the receiving unit 903 may be configured to interact such as query the second network node 14 whether there is DC content for the IMS session and receive a response, and/or the first network node 13, the processing circuitry 901, and/or the receiving unit 903 may be configured to obtain information regarding capability of supporting DC content one or more UEs. The first network node 13, the processing circuitry 901, and/or the receiving unit 903 may be configured to initiate a request or a query to the second network node 14 to verify if any of the participants in the IMS session has DC content that may require bootstrapping. The request includes identities or other information on the UE(s) that are subject of the query. The request may also include a Session ID for correlation purposes.

The first network node 13 may comprise a transmitting unit 904, e.g. a transmitter or a transceiver. The first network node 13, the processing circuitry 901, and/or the transmitting unit 904 is configured to reserve the needed one or more media resources for anchoring the bootstrap data at the second network node 14 such as the enhanced MRF. The first network node 13, the processing circuitry 901, and/or the transmitting unit 904 may be configured to transmit a request to the second network node 14 to reserve media resources. The first network node 13, the processing circuitry 901, and/or the transmitting unit 904 may be configured to transmit an update request such as a Nmrf'_session_ Update request comprising e.g. session ID, resource ID, additional resource related information e.g. egress/ingress contact information to be used by the MRF' for resource ID. The first network node 13, the processing circuitry 901, and/or the transmitting unit 904 may be configured to transmit to the second network node 14 a release request such as a Nmrf'_Session_Release request comprising e.g. session ID, Resource ID or indicating all resources.

The first network node 13, the processing circuitry 901, and/or the transmitting unit 904 may be configured to provide the second network node 14 and/to the third network node 15 with contact information and/or resource information required for bootstrapping the data channel information to the IMS session. For example, the first network node 13, the processing circuitry 901, and/or the transmitting unit 904 may be configured to provide the third network node 15 with the MRF Egress information, such as address, for Bootstrap data as an example. The first network node 13, the processing circuitry 901, and/or the obtaining unit 903 may be configured to receive a response from the third network node 15 comprising contact information of the third network node 15 such as the DC server Bootstrapping addressing information, DC Server ingress Information, or the third network node 15 may include contact information of the third network node such as the DC Server ingress Information in a separate subsequent request. Additionally or alternatively, the first network node 13, the processing circuitry 901, and/or the transmitting unit 904 may be configured to update the second network node 14 with IP AGW Egress information and/or with DC Server ingress Information or DC server Bootstrapping addressing information.

The first network node 13, the processing circuitry 901, and/or the obtaining unit 903 may be configured to receive a response such as a Nmrf'_Session_Update response comprising e.g. result, additional resource related information and/or a response such as a Nmrf'_Session_Release Response comprising e.g. the result.

The first network node 13 may comprise a storing unit 905. The first network node 13, the processing circuitry 901, and/or the storing unit 905 may be configured to store (indication of) information from the response and/or regarding the capability. The first network node 13, the processing circuitry 901, and/or the storing unit 905 may be configured to store the response which is bound to the ongoing IMS session.

The first network node 13 further comprises a memory 909. The memory 909 comprises one or more units to be used to store data on, such as indications, configurations, resource information, contact information, DC information, IMS information, session ID, UE information, and applications to perform the methods disclosed herein when being executed, and similar. Furthermore, the first network node 13 may comprise a communication interface 908 such as comprising a transmitter, a receiver and/or a transceiver, and/or one or more antennas.

The methods according to the embodiments described herein for the first network node 13 are respectively implemented by means of e.g. a computer program product 906 or a computer program, comprising instructions, i.e., software code portions, which, when executed on at least one processor, cause the at least one processor to carry out the actions described herein, as performed by the first network node 13. The computer program product 906 may be stored on a computer-readable storage medium 907, e.g., a disc, a universal serial bus (USB) stick or similar. The computer-readable storage medium 907, having stored thereon the computer program product, may comprise the instructions which, when executed on at least one processor, cause the at least one processor to carry out the actions described herein, as performed by the first network node 13. In some embodiments, the computer-readable storage medium may be a transitory or a non-transitory computer-readable storage medium. Thus, embodiments herein may disclose a first network node 13 for handling communication in a wireless communications network, wherein the first network node 13 comprises processing circuitry and a memory, said memory comprising instructions executable by said processing circuitry whereby said first network node 13 is operative to perform any of the methods herein.

Figure 10B:
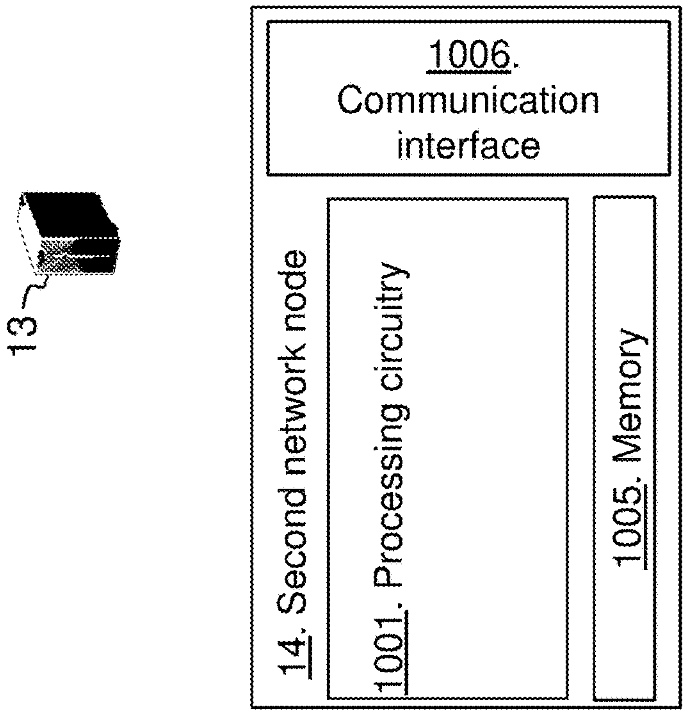
FIGS. 10*a*-10*b* show block diagrams depicting embodiments of a second network node according to embodiments herein.
Figure 10A:
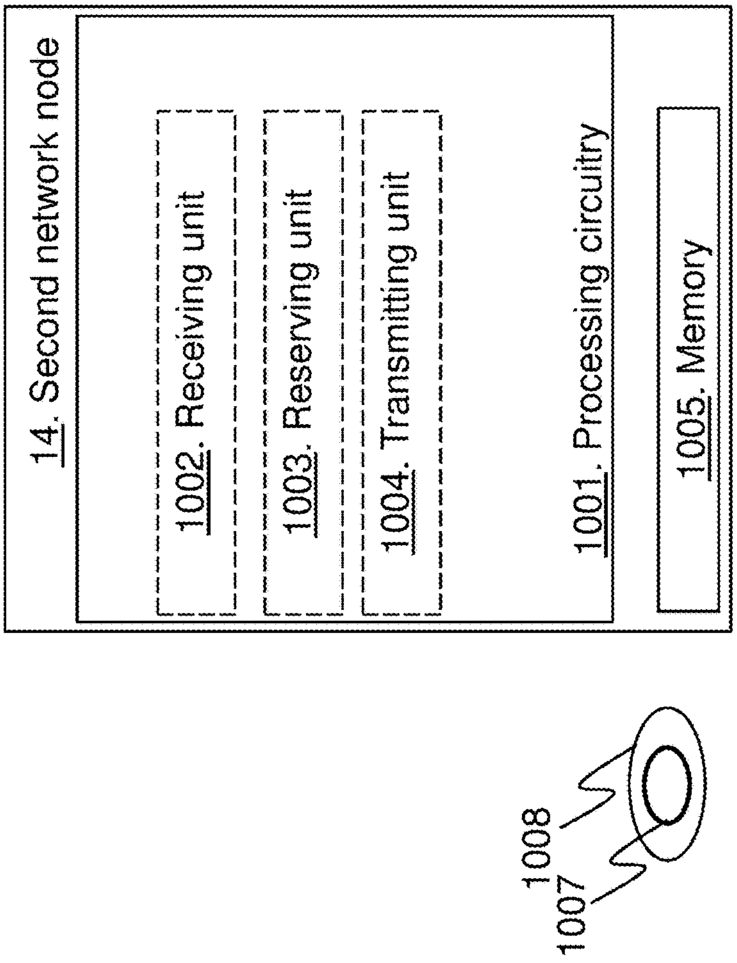

FIGS. 10*a*-10*b* are block diagrams depicting the second network node 14 such as an enhanced MRF, for handling the IMS session of one or more Ues in the communication network 1 according to embodiments herein.

The second network node 14 may comprise processing circuitry 1001, e.g. one or more processors, configured to perform the methods herein.

The second network node 14 may comprise a receiving unit 1002, e.g. a receiver and/or a transceiver. The second network node 14, the processing circuitry 1001, and/or the receiving unit 1002 may be configured to receive from the first network node 13 a request, indicating a need to reserve one or more media resources, such as media proxying capability, or conferencing, etc., for bootstrapping DC media information to the IMS session. Input parameters in the request may include one or more of the following: Session ID, Resource ID, Resource ID related Information. The request may comprise Egress and/or Ingress contact Information to be used by the second network node 14 for the related Media ID.

The second network node 14, the processing circuitry 1001, and/or the receiving unit 1002 may be configured to obtain contact information for the third network node 15 required for bootstrapping the data channel information to the IMS session.

The second network node 14, the processing circuitry 1001, and/or the receiving unit 1002 may be configured to obtain from the first network node 13, contact information relating to the IMS session, e.g. address information, IP information, and/or UE information, and/or resource information required for bootstrapping the data channel information to the IMS session. For example, the IMS AS 13 may update enhanced MRF with IP AGW Egress information and/or with DC Server ingress Information, or DC server Bootstrapping addressing information.

The second network node 14, the processing circuitry 1001, and/or the receiving unit 1002 may be configured to receive an update request such as a Nmrf'_session_Update request comprising e.g. session ID, resource ID, additional resource related information e.g. egress/ingress contact information to be used by the MRF' for resource ID. The second network node 14, the processing circuitry 1001, and/or the receiving unit 1002 may be configured to receive from the first network node 13 a release request such as a Nmrf'_Session_Release request comprising e.g. session ID, Resource ID or indicating all resources.

The second network node 14 may comprise a reserving unit 1003. The second network node 14, the processing circuitry 1001, and/or the reserving unit 1003 may be configured to reserve resources and map a session ID to the reserved resources.

The second network node 14 may comprise a transmitting unit 1004, e.g. a transmitter and/or a transceiver. The second network node 14, the processing circuitry 1001, and/or the transmitting unit 1004 is configured to transmit the response to the first network node 13. The response indicates rejection or confirmation of one or more media resources reserved for the IMS session. The response may comprise one or more of the following: indication of Success or Failure, Resource related information, e.g., the Egress information to be used by the Resource ID, or updated egress information.

The second network node 14, the processing circuitry 1001, and/or the transmitting unit 1004 may be configured to transmit a response to the update request such as a Nmrf'_Session_Update response comprising e.g. result, additional resource related information and/or a response such as a Nmrf'_Session_Release Response comprising e.g. the result.

The second network node 14 further comprises a memory 1005. The memory 1005 comprises one or more units to be used to store data on, such as indications, IMS information, Resource information, session ID, contact information, thresholds, data related to nodes, and applications to perform the methods disclosed herein when being executed, and similar. Furthermore, the second network node 14 may comprise a communication interface 1006 such as comprising a transmitter, a receiver and/or a transceiver, and/or one or more antennas.

The methods according to the embodiments described herein for the second network node 14 are respectively implemented by means of e.g. a computer program product 1007 or a computer program, comprising instructions, i.e., software code portions, which, when executed on at least one processor, cause the at least one processor to carry out the actions described herein, as performed by the second network node 14. The computer program product 1007 may be stored on a computer-readable storage medium 1008, e.g. a disc, a universal serial bus (USB) stick or similar. The computer-readable storage medium 1008, having stored thereon the computer program product, may comprise the instructions which, when executed on at least one processor, cause the at least one processor to carry out the actions described herein, as performed by the second network node 14. In some embodiments, the computer-readable storage medium may be a transitory or a non-transitory computer-readable storage medium. Thus, embodiments herein may disclose a second network node 14 for handling communication in a wireless communications network, wherein the second network node 14 comprises processing circuitry and a memory, said memory comprising instructions executable by said processing circuitry whereby said second network node 14 is operative to perform any of the methods herein.

Figure 11B:
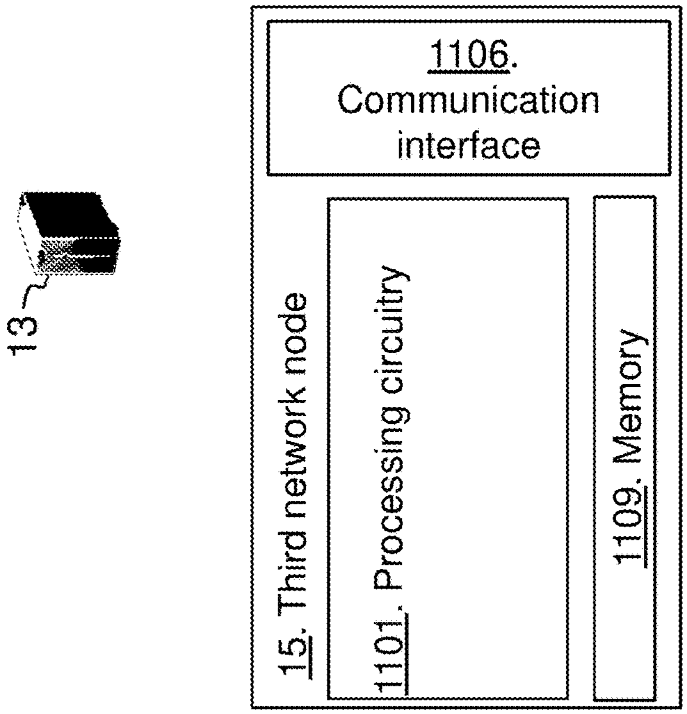
FIGS. 11*a*-11*b* show block diagrams depicting embodiments of a third network node according to embodiments herein.
Figure 11A:
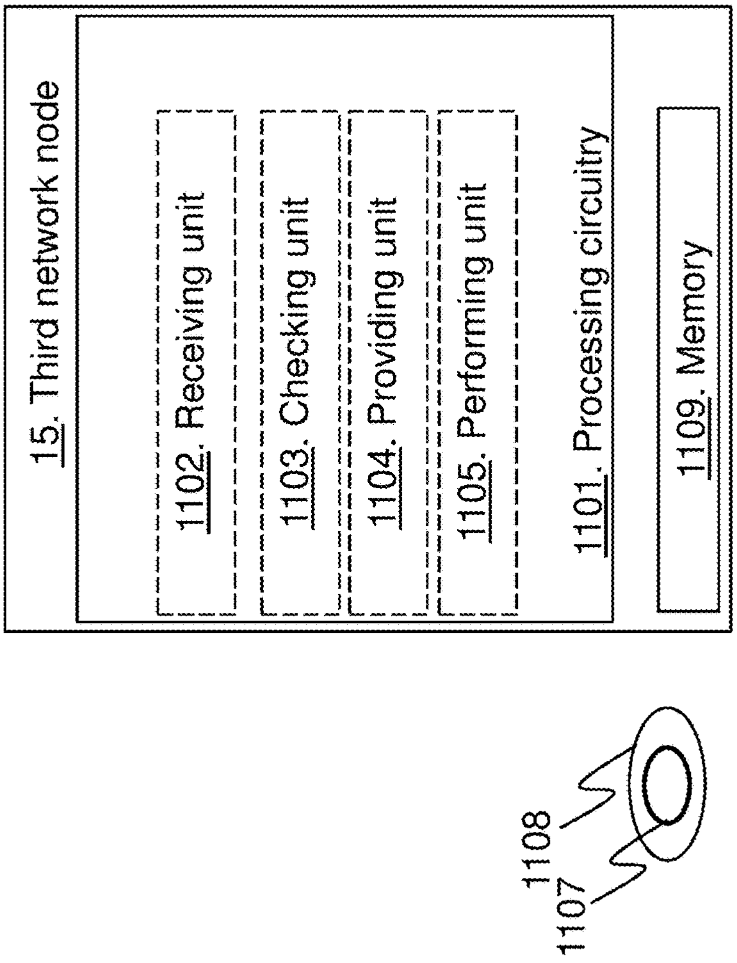

FIGS. 11*a*-11*b* are block diagrams depicting the third network node 15 such as a DC server, for handling the IMS session of one or more UEs in the communication network 1 according to embodiments herein.

The third network node 15 may comprise processing circuitry 1101, e.g. one or more processors, configured to perform the methods herein.

The third network node 15 may comprise a receiving unit 1102, e.g. a receiver and/or a transceiver. The third network node 15, the processing circuitry 1101, and/or the receiving unit 1102 is configured to obtain contact and/or resource information required for bootstrapping the data channel information to the IMS session. For example, the third network node 15, the processing circuitry 1101, and/or the receiving unit 1102 may be configured to receive from the first network node 13 contact information for bootstrapping. For example, the third network node 15, the processing circuitry 1101, and/or the receiving unit 1102 may be configured to receive needed information, where applicable, to UEs, i.e., IMS clients, engaged in the IMS session and for which such bootstrapping is required. The third network node 15, the processing circuitry 1101, and/or the receiving unit 1102 may be configured to receive from the first network node 13 a query whether there is DC content for the IMS session. For example, the third network node 15, the processing circuitry 1101, and/or the receiving unit 1102 may be configured to receive a request or query to verify if any of the UEs in the IMS session has DC content that may require bootstrapping. The request may include the UE(s) that are subject of the query. The request may also include a Session ID for correlation purposes.

The third network node 15 may comprise a checking unit 1103. The third network node 15, the processing circuitry 1101, and/or the checking unit 1103 may be configured to check the IMS session for DC content indication, for example, based on session ID.

The third network node 15 may comprise a providing unit 1104, e.g. a transmitter and/or a transceiver. The third network node 15, the processing circuitry 1101, and/or the providing unit 1104 may be configured to respond back to the first network node 13 comprising contact information of the third network node such as the DC Server ingress Information, DC server Bootstrapping addressing information, or be configured to include contact information of the third network node 15 such as the DC Server ingress Information in a separate subsequent request. The third network node 15, the processing circuitry 1101, and/or the providing unit 1104 may be configured to provide data relating to bootstrapping of data channel information to the IMS session. For example, the third network node 15, the processing circuitry 1101, and/or the providing unit 1104 may be configured to respond to the first network node 13 with a response confirming DC content for any of the UEs in the IMS session or not.

The third network node 15 may comprise a performing unit 1105. The third network node 15, the processing circuitry 1101, and/or the performing unit 1105 may be configured to perform bootstrapping of DC content in the IMS session based on the contact and/or resource information.

The third network node 15 further comprises a memory 1109. The memory 1109 comprises one or more units to be used to store data on, such as indications, IMS information, DC server information, resource information, bootstrap information, content, session ID, contact information, thresholds, data related to nodes, and applications to perform the methods disclosed herein when being executed, and similar. Furthermore, the third network node 15 may comprise a communication interface 1106 such as comprising a transmitter, a receiver and/or a transceiver, and/or one or more antennas.

The methods according to the embodiments described herein for the third network node 15 are respectively implemented by means of e.g. a computer program product 1107 or a computer program, comprising instructions, i.e., software code portions, which, when executed on at least one processor, cause the at least one processor to carry out the actions described herein, as performed by the third network node 15. The computer program product 1107 may be stored on a computer-readable storage medium 1108, e.g. a disc, a universal serial bus (USB) stick or similar. The computer-readable storage medium 1108, having stored thereon the computer program product, may comprise the instructions which, when executed on at least one processor, cause the at least one processor to carry out the actions described herein, as performed by the third network node 15. In some embodiments, the computer-readable storage medium may be a transitory or a non-transitory computer-readable storage medium. Thus, embodiments herein may disclose a third network node 15 for handling communication in a wireless communications network, wherein the third network node 15 comprises processing circuitry and a memory, said memory comprising instructions executable by said processing circuitry whereby said third network node 15 is operative to perform any of the methods herein.

In some embodiments a more general term "network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are IoT capable device, target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate actions, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

It is herein disclosed embodiments such as:

Embodiment 1

A method performed by a first network node, such as a IMS AS, for handling an IMS session of one or more UEs in a communication network, the method comprising obtaining data relating to bootstrapping of data channel information to the IMS session; and reserving one or more needed media resources at a second network node 14, such as the enhanced MRF, for bootstrapping data channel information to the IMS session.

Embodiment 2

The method according to embodiment 1; wherein reserving the needed one or more media resources comprises transmitting a request to the second network node to reserve media resources, and receiving a response from the second network node.

Embodiment 3

The method according to embodiment 2, wherein the response comprises resource information such as MRF egress information.

Embodiment 4

The method according to any of the embodiments 1-3, further comprising providing, to the second network node and/or a third network node, such as a DC server, contact information relating to the IMS session, e.g. address information, IP information, and/or UE information, and/or resource information required for bootstrapping the data channel information to the IMS session.

Embodiment 5

The method according to embodiment 4, wherein providing contact information and/or resource information to the second network node and/or the third network node comprises updating the third network node with MRF egress information, or requesting the contact information from the third network node, and receiving a response comprising contact information of the third network node such as the DC Server ingress Information, or a separate subsequent request including contact information of the third network node.

Embodiment 6

The method according to any of the embodiments 4-5, wherein providing contact information and/or resource information to the second network node and/or the third network node comprises updating the second network node with IP AGW Egress information and/or with DC Server ingress Information.

Embodiment 7

A method performed by a second network node 14, such as an enhanced MRF or MRF node, for handling an IMS session of one or more UEs in a communication network, the method comprising receiving a request from a first network node, indicating a need to reserve one or more media resources for bootstrapping DC media information to the IMS session; and transmitting a response to the first network node 13, wherein the response indicates rejection or confirmation of one or more media resources reserved for the IMS session.

Embodiment 8

The method according to embodiment 7, further comprising reserving one or more media resources and mapping a session ID to the reserved one or more media resources.

Embodiment 9

The method according to any of the embodiments 7-8, further comprising obtaining contact information and/or resource information for bootstrapping the DC media information to the IMS session.

Embodiment 10

The method according to embodiment 9, wherein obtaining the contact information and/or resource information comprises receiving from the first network node IP AGW Egress information and/or with DC Server ingress Information.

Embodiment 11

A method performed by a third network node 15, such as DC server, for handling an IMS session of one or more UEs in a communication network, the method comprising obtaining contact and/or resource information required for bootstrapping data channel information to the IMS session, wherein the resource information is related to one or more media resources reserved for the IMS session.

Embodiment 12

The method according to embodiment 11, wherein obtaining resource information comprises receiving from the first network node MRF Egress information, such as address, for Bootstrap data.

Embodiment 13

The method according to any of the embodiments 11-12, further comprising transmitting a response, to a request or the obtained resource information, to the first network node, wherein the response comprises contact information of the third network node such as the DC Server ingress Information, or transmit a separate subsequent request including contact information of the third network node.

Embodiment 14

A first network node, such as a IMS AS, for handling an IMS session of one or more UEs in a communication network, wherein the first network node is configured to obtains data relating to bootstrapping of data channel information to the IMS session; and reserve one or more needed media resources at a second network node 14 for bootstrapping of data channel information to the IMS session.

Embodiment 15

A second network node, such as an enhanced MRF node, for handling an IMS session of one or more UEs in a communication network, wherein the second network node is configured to receive a request from a first network node, indicating a need to reserve one or more media resources for bootstrapping DC media information to the IMS session; and transmit a response to the first network node, wherein the response indicates rejection or confirmation of one or more media resources reserved for the IMS session Embodiment 16

A third network node 15, such as DC server, for handling an IMS session of one or more UEs in a communication network, wherein the third network node is configured to obtain contact and/or resource information required for bootstrapping data channel information to the IMS session, wherein the resource information is related to one or more media resources reserved for the IMS session.

ANNEX I

1. Proposal

It is proposed to accept the following changes to TR 23.700-78

First Change 6.16 Solution #16: Solution for IMS Media Support for DC Server 6.16.1 Description In this solution, the MRF is enhanced to support the IMS DC feature. To provide the DC server or DC Signalling Function (DCSF) with the enhanced MRF Egress information for Bootstrap data as an example, as well as receive the DCSF bootstrapping addressing information, the IMS AS interacts with the DCSF for that purpose.

FIG. 4*c* depicts a high level architecture diagram for the enhanced MRF solution showing the architecture of the IMS for supporting the IMS Data Channel feature, illustrating the interworking between IMS and other entities needed to support DC feature in this option. In this architecture, the IMS MRF is enhanced to support additional functionality related to Data Channel server (DC server) or DCSF while maintaining backward compatibility, and reusability. MRFs that are expected to support DC feature shall be enhanced for that purpose.

NOTE: Not all deployed MRFs needs to be enhanced to support DC feature

FIG. 4c includes the following interfaces:

IF1 between the enhanced MRF and DCSF for media transport related to bootstrapping and application data. IF1 is HTTP based. IMS is transparent at the application level.

IF6 between the IMS AS and DCSF for managing DC feature related to IMS channel including media control. This interface hast to be extensible and support vendor specific information with no impact on interoperability. IF6 is service based.

IF7 between the IMS DCSF and the NEF.

IF8 between third party AS and the Operator IT network, where it is assumed the DCSF is hosted. The interface has to be extensible and support vendor specific elements.

DCSF includes the DC store

MRF includes MRFC/MRFP

IF1, IF6, IF7 are in scope of the TR. IF7 is out of Release 18.

F8 is out of scope of the TR.

Nimsas implements services supported by the IMS AS.

Ndcs implements services supported by the DCSF.

FIG. 4c: IMS DC Enhanced MRF Architectural Option 6.16.2 Procedures 6.16.2.1 IMS Session Initiation detailed Procedures The call flow in FIG. 5-6 illustrates the various interactions within an IMS DC related session related to the DC feature. Interactions triggered by UEs related to the actual initiation of bootstrapping are not included.

The following is a brief description of the steps in the call flow:

In step 1, UE registers in IMS after successfully establishing an IMS PDU session.

In step 2, UE initiates an IMS session, and indicates support for the IMS DC feature in the SDP as per TS 26.114 [6]. It is assumed that the network also supports the IMS DC feature.

In step 3, the IMS AS initiates interaction with the IMS DCSF to verify if any of the participants in the IMS session has DC content that may require bootstrapping. Interaction includes sending to the DCSF the IMS targets that are subject of the query. This step can also be postponed till after step 9.

In step 4, the IMS AS engages the enhanced MRF for the needed media resources for anchoring the bootstrap data.

In step 5-6, the session establishment procedure is successfully completed based on existing procedures. It is assumed in this call flow that both; originating and terminating UE support the IMS DC feature.

In step 7, the IMS AS updates the SDP towards the UE so that the IMS AGW is updated with the media anchoring MRF Ingress information related to the bootstrap data.

FIG. 5-6: IMS Session Initiation

In step 9, the SIP ACK is sent to the target.

In step 10 DCSF is updated with the MRF Egress information for the Bootstrap data.

In step 11, IMS AS updates the media anchoring node MRF with the IP AGW Egress information.

As can be seen the Bootstrap data traverses through enhanced MRF, while the actual voice media bypasses the enhanced MRF.

6.16.2.2 DCSF Services

The table below highlights the services to be supported by the DC Server. The subsequent sections depict how these services are used as examples:

| Service Name | Service Operations | Operation Semantics | Example Consumer(s) | Comments |
|---|---|---|---|---|
| Ndcsf_Session | Query | Request/Response | IMS AS | Input parameters includes the Session ID, one or more TargetID (s) in the IMS session.<br>Expected output parameter is Success or Failure. Success means that at least one target requires bootstrapping. Failure means that no target needs any bootstrapping |
| | Release | Request/Response | IMS AS | Input parameters includes the Session ID.<br>Expected output parameter is Success or Failure. |
| Ndcsf_Media | Update | Request/Response | IMS AS | This service enables a request to be sent to the DCSF to update the DCSF with Egress media information for media associated with an IMS Target.<br>Input parameters include the Session ID, IMS TargetID, Media Type, Resource ID. Resource ID includes an identity for the used resource and the addressing information.<br>Optional parameters include Media purpose (e.g. Bootstrap), ResourceIDContainer. ResourceIDContainer depends on the media type.<br>Expected output parameter is Success or Failure. |
| | Release | Request/Response | IMS AS | This service enables a request to be sent to the DCSF to remove Egress media information for media |

-continued

| Service Name | Service Operations | Operation Semantics | Example Consumer(s) | Comments |
| --- | --- | --- | --- | --- |
| | | | | associated with an IMS Target. Input parameters includes the Session ID, ResourceID.Media Type. Expected output parameter is Success or Failure. |
| NdcsfEventExposure | Subscribe Unsubscribe Notify | Subscribe/Notify | FFS | FFS |

Every Resource ID reserved for any purpose within the same IMS session and for a media type must be unique. Media Types used for different medias within a single IMS session must be unique. Every media is allocated a unique Media Type by the NF that initiates the request for such media within the same IMS session. Additionally, Media Type used by the IMS AS and DCSF must be identical for same media related Request/Responses in the same IMS session. This enables both ends to bind the allocated resources with the Media Type for every Media Type supported in the same IMS session.

As an example: An IMS session has bootstrapping media type and data application media type: The following information is maintained at both the IMS AS and DCSF:

| NF | Media Type | Resources IDs | IMS Session ID |
| --- | --- | --- | --- |
| IMS AS | Bootstrap media | Res1, Res. 2 | Session 1 |
| DCSF | Bootstrap media | Res1, Res. 2 | Session 1 |
| IMS AS | Data Application 1 | Re3, Res. 4 | Session 1 |
| DCSF | Data Application 1 | Res3, Res. 4 | Session 1 |

The section below depicts examples on how these services are invoked individually within the context of the main IMS session procedure in section 6.16.2.1

6.16.2.2.1 IMS Session Initiation Procedure:

The call flow in FIG. 7*b* illustrates the interaction between the IMS AS and DCSF to bootstrap needed information, where applicable, to IMS clients engaged in an IMS session and for which such bootstrapping is required.

FIG. 7*b* IMS AS DC Interaction Framework—Session Initiation

The following is a brief description of the steps in the call flow:

Steps 0-3 correspond to step 3 in the call flow in FIG. 5

In step 0, IMS AS performs DCSF discovery based on existing procedures in TS 23.502 [2].

In step 1, a trigger for initiating interaction with the DCSF is fulfilled. The trigger can be an originating/terminating session with the DC feature for an IMS session where the two parties in the IMS session indicated support for the DC feature.

In step 2*a*, the IMS AS initiates a Ndcsf_Session_Query Request with the DCSF to verify if any of the participants in the IMS session has DC content that may require bootstrapping. The Request includes one or more of IMS target(s) Identity that are subject of the query. The Request also includes a Session ID for correlation purposes. The IMS receives a response in step 2*b*.

Editor's note: Additional information to be included in Request and response is FFS.

In step 3, IMS AS stores the response which is bound to the ongoing IMS session.

In step 4, DCSF stores the information related to the IMS session, This information is deleted when the DCSF receives a request to release the session.

6.16.2.2.2 IMS Session Tear Down Procedure:

FIG. 7*c* IMS AS DC Interaction Framework—Session Release

The following is a brief description of the steps in the call flow:

In step1, IMS AS detects that an IMS session subject to DCSF bootstrapping is torn down.

In step 2*a*, the IMS AS initiates a Ndcsf_Session_Release Request to inform DCSF that a DC related IMS session has terminated. The Request also includes the Session ID. The IMS receives a response in step 2*b*.

Editor's note: Additional information to be included in Request and response are FFS.

In step 3, DCSF uses the Session ID to locate the target session stored information and deletes the stored state.

In step 4, IMS AS deletes the stated associated with the IMS session.

The IMS AS charging information includes information to indicate that the IMS session utilized the DC feature. The DCSF may also produce records to that effect.

6.16.2.2.3 IMS Session Modification Procedure.

When an ongoing IMS session that did not include the DC feature at session establishment, is later modified by either target in the IMS session to become an IMS session with DC feature successfully negotiated, the IMS AS performs identical to the steps taken at IMS session initiation in FIG. 7*c*.

6.x.2.2.4 IMS Media Update

Once the IMS AS reserves the necessary resources in the enhanced MRF for the media that has to be managed by the IMS session and the DCSF, the IMS AS needs to inform the DCSF of the Egress information to be used for the media. This corresponds to step 10 in FIG. 6. Subsequently, the DCSF informs the IMS AS of the DCSF ingress information. The enhanced MRF is than updated with this information, which corresponds to step 12 in FIG. 6.

FIG. 8*b* IMS AS DC Interaction Framework-Media Update

In step 1, IMS successfully reserved the needed resources in the enhanced MRF.

In step 2*a*, IMS AS initiates an Ndcsf_Media_Update Request to the DCSF. The Request includes the IMS target contact information for bootstrapping purposes as an example, and necessary media related information. The IMS receives a response in step 2*b*.

In step 3, IMS AS stores the information for later use.

In step 4, DCSF updates the information related to the IMS session.

In step 5*a*, DCSF initiates an Nimsas_Media_Update Request to the IMS AS. The Request includes the IMS target contact information for bootstrapping purposes as an example, and the necessary media related information. The IMS receives a response in step 5*b*.

In steps 6, and 7, IMS AS and DCSF updates their states respectively with the information.

6.16.2.3 IMS AS Services

The table below highlights the services to be supported by the IMS AS.

| Service Name | Service Operations | Operation Semantics | Example Consumer(s) | Comments |
|---|---|---|---|---|
| Nimsasdc_Media | Reserve | Request/Response | DCSF | This service enables a request to be sent to the IMS AS to reserve media associated with an IMS Target and required by the DCSF. Input parameters include the Session ID, IMS TargetID, Media Type, Resource ID. In this case the resource ID includes only an identity. Optional Parameter includes Media purpose (e.g. Bootstrap), ResourceIDContainer. Expected output parameter is Success or Failure. |
| | Update | Request/Response | DCSF | This service enables a request to be sent to the IMS AS to update the IMS AS with Ingress media information associated with an IMS Target. Input parameters include the Session ID, IMS TargetID, Media Type, Resource ID. In this case Resource ID includes an identity for the used resource and the addressing information. Optional parameters include Media purpose, ResourceIDContainer. Expected output parameter is Success or Failure. |
| | Release | Request/Response | DCSF | This service enables a request to be sent to the IMS AS to release a previous resource reserved for an IMS TargetID. Input parameters include the Session ID, IMS TargetID, Resource ID. Expected output parameter is Success or Failure. |
| Ndcs_EventExposure | Subscribe Unsubscribe Notify | Subscribe/Notify | FFS | FFS |

| Service Name | Service Operations | SOperation Semantics | Example Consumer(s) | Comments |
|---|---|---|---|---|
| Nimsas_Media | Reserve | Request/Response | DC Server | This service enables a request to be sent to the IMS AS to reserve media associated with an IMS Target and required by the DC server. Input parameters include the Session ID, IMS TargetID, Media Type, Resource ID. In this case the resource ID includes only an identity. Optional Parameter includes Media purpose (e.g. Bootstrap), ResourceIDContainer. Expected output parameter is Success or Failure. |
| | Update | Request/Response | DC Server | This service enables a request to be sent to the IMS AS to update the IMS AS with Ingress media information associated with an IMS Target. Input parameters include the Session ID, IMS TargetID, Media Type, Resource ID. In this case Resource ID includes an identity for the used resource and the addressing information. Optional parameters include Media purpose, ResourceIDContainer. |

-continued

| | | | | |
|---|---|---|---|---|
| | | | | Expected output parameter is Success or Failure. |
| | Release | Request/Response | DC Server | This service enables a request to be sent to the IMS AS to release a previous resource reserved for an IMS TargetID.<br>Input parameters include the Session ID, IMS TargetID, Resource ID.<br>Expected output parameter is Success or Failure. |
| Ndcsf_EventExposure | Subscribe<br>Unsubscribe<br>Notify | Subscribe/Notify | FFS | FFS |

Properties Related to Media Type, Resource ID are Identical to What is Described in Clause 6.16.2.2

6.16.3 Impacts on Existing Nodes and Functionality

IMS AS

Implements Nimsasdc Services

Interacts with the enhanced MRF

Enhanced MRF

Support IMS AS information related to IMS DC

DCSF

Implement Ndcsf Services

End of Changes

Option2 for Defining Services

DCSF Services

The table below highlights the services to be supported by the DCSF. The subsequent sections depict how these services are used as examples:

| Service Name | Service Operations | Operation Semantics | Example Consumer(s) | Service Description |
|---|---|---|---|---|
| Ndcsf_Session | Query | Request/Response | IMS AS | Input parameters includes the Session ID, one or more TargetID (s) in the IMS session.<br>Expected output parameter is Success or Failure. Success means that at least one target requires bootstrapping. Failure means that no target needs any bootstrapping |
| | Release | Request/Response | IMS AS | Input parameters includes the Session ID.<br>Expected output parameter is Success or Failure. |
| Ndcsf_Media | Allocate | Request/Response | IMS AS | This service enables a request to be sent to the DCSF to update the DCSF with Egress media information (downstream towards the UE) for media associated with an IMS Target, and to request the DCSF to allocate a corresponding Ingress Media in the DCSF for the upstream path towards the DCSF. The response includes the DCSF Ingress media information<br>Input parameters include the Session ID, IMS TargetID, Media Type, Resource ID, QoS, Egress media Information for the downstream. Resource ID includes an identity for the used resource and the addressing information.<br>Optional parameters include Media purpose (e.g. DataChannel), ResourceIDContainer. ResourceIDContainer depends on the media type. |

-continued

| Service Name | Service Operations | Operation Semantics | Example Consumer(s) | Service Description |
|---|---|---|---|---|
| | | | | Expected output parameter is Success or Failure. In case of success the DCSF Ingress media information is included |
| | Update | Request/Response | IMS AS | This service enables a request to be sent to the DCSF to update the DCSF with any parameter (e.g. QoS) related to a previous established media path. Input parameters include the Session ID, IMS TargetID, Media Type, Resource ID, and the updated information. Optional parameters include Media purpose (e.g. DataChannel), ResourceIDContainer. ResourceIDContainer depends on the media type. Expected output parameter is Success or Failure. |
| | Release | Request/Response | IMS AS | This service enables a request to be sent to the DCSF to remove resources allocated for an previously established media path. Input parameters includes the Session ID, ResourceID.Media Type. Both upstream and downstream path are gone as a result of this operation. Expected output parameter is Success or Failure. |

Every Resource ID reserved for any purpose within the same IMS session and for a media type must be unique. Media Types used for different medias within a single IMS session must be unique. Every media is allocated a unique Media Type by the NF that initiates the request for such media within the same IMS session. Additionally, Media Type used by the IMS AS and DCSF must be identical for same media related Request/Responses in the same IMS session. This enables both ends to bind the allocated resources with the Media Type for every Media Type supported in the same IMS session, as an example: An IMS session has bootstrapping media type and data application media type: The following information is maintained at both the IMS AS and DCSF:

| NF | Media Type | Resources IDs | IMS Session ID |
|---|---|---|---|
| IMS AS | Bootstrap media | Res1 | Session 1 |
| DCSF | Bootstrap media | Res1 | Session 1 |
| IMS AS | Data Application 1 | Res2 | Session 1 |
| DCSF | Data Application 1 | Res2. | Session 1 |

IMS AS Services

The table below highlights the services to be supported by the IMS AS.

| Service Name | Service Operations | Operation Semantics | Example Consumer(s) | Service Description |
|---|---|---|---|---|
| Nimsasdc_Media | Alllocate | Request/Response | DCSF | This service enables a request to be sent to the IMS AS to reserve media associated with an IMS Target (downstream path) and required by the DCSF. The request includes the media information reserved by the DCSF for the upstream path. The response includes the media information reserved by the IMS AS to be used by the DCSF. Input parameters include the Session ID, IMS TargetID, Media Type, Resource ID, and DCSF media related information. Optional Parameter includes Media purpose (e.g. Bootstrap), ResourceIDContainer. Expected output parameter is Success or Failure. In case of |

-continued

| Service Name | Service Operations | Operation Semantics | Example Consumer(s) | Service Description |
|---|---|---|---|---|
| | | | | success, the IMS AS reserved media information is included in the response. |
| | Update | Request/Response | DCSF | This service enables a request to be sent to the IMS AS to update the IMS AS with any parameter (e.g. QoS) related to a previous established media path. Input parameters include the Session ID, IMS TargetID, Media Type, Resource ID, and the updated information. Optional parameters include Media purpose (e.g. Bootstrap), ResourceIDContainer. ResourceIDContainer depends on the media type. Expected output parameter is Success or Failure. |
| | Release | Request/Response | DCSF | This service enables a request to be sent to the IMS AS to release a previous resource reserved for an IMS TargetID. Input parameters include the Session ID, IMS TargetID, Resource ID. Both upstream and downstream path are gone as a result of this operation. Expected output parameter is Success or Failure. |

ANNEX II

Proposal

It is proposed to accept the following changes to TR 23.700-78

First Change 6.0 Mapping of Solutions to Key Issues

| Solutions | Key Issues | |
|---|---|---|
| XX | X | X |

6.X Solution #XX: <Solution for IMS Media Support for DC Server>

6.X.1 Description

In this solution, a new MRF, called MRF' is dedicated for the IMS DC feature. MRF' is service based. It offers services to reserve resources, update the reserved resources with needed contact information for DC server media, e.g. Bootstrap data, and finally release the reserved resources.

To provide the DC server with the MRF' Egress information for Bootstrap data as an example, the IMS AS interacts with the DC server for that purpose.

Note: IMS AS has already discovered the DC server and established interaction with the DC server during IMS session setup.

IMS AS is the only consumer of MRF'. Interaction between IMS AS and MRF' occurs with an IMS DC related session.

6.X.2 Procedures 6.x.2.1 IMS Session Initiation Detailed Procedures

Figure 12:
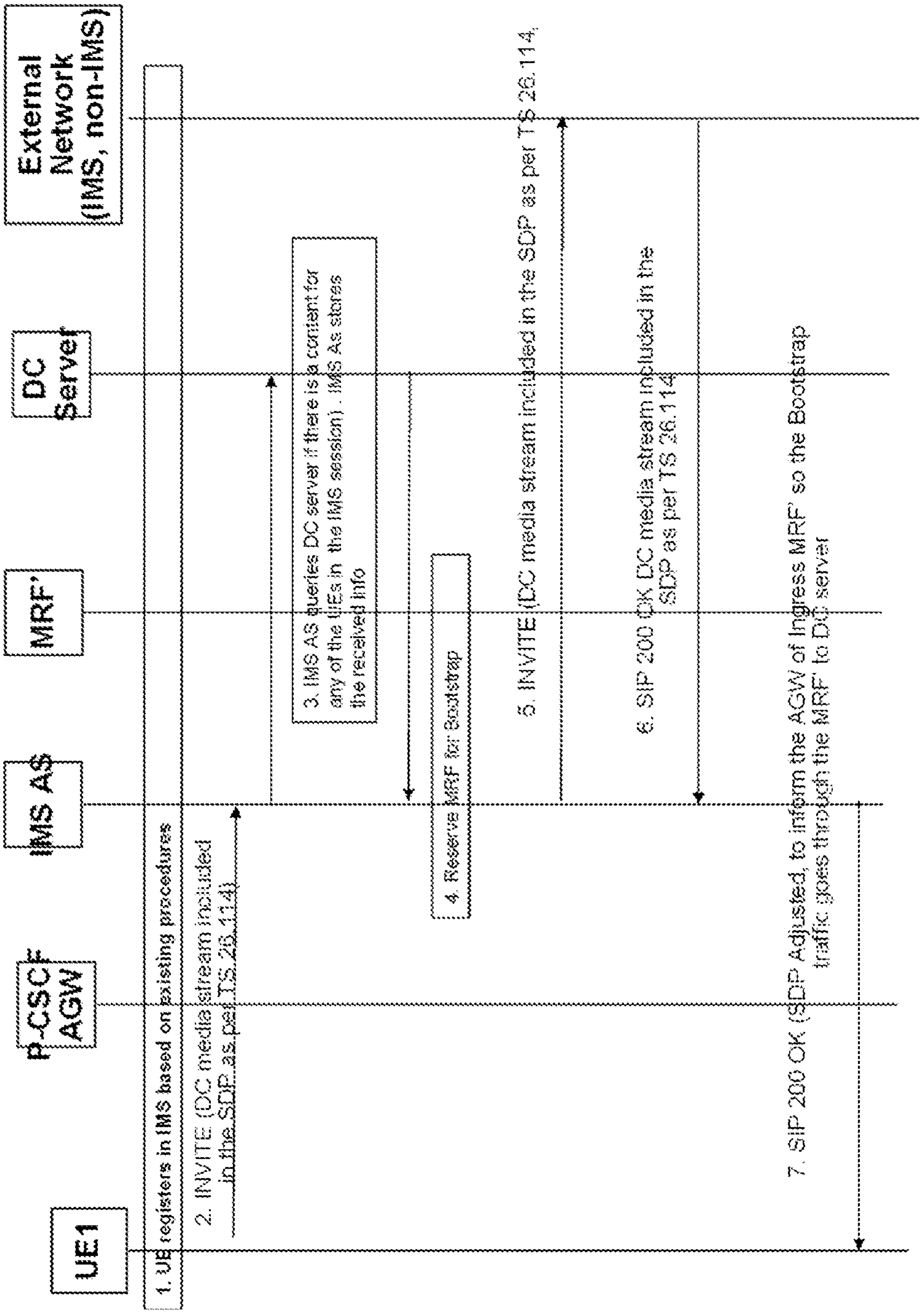
FIG. 12 shows a combined signalling scheme and flowcharts depicting embodiments herein.
Figure 13:
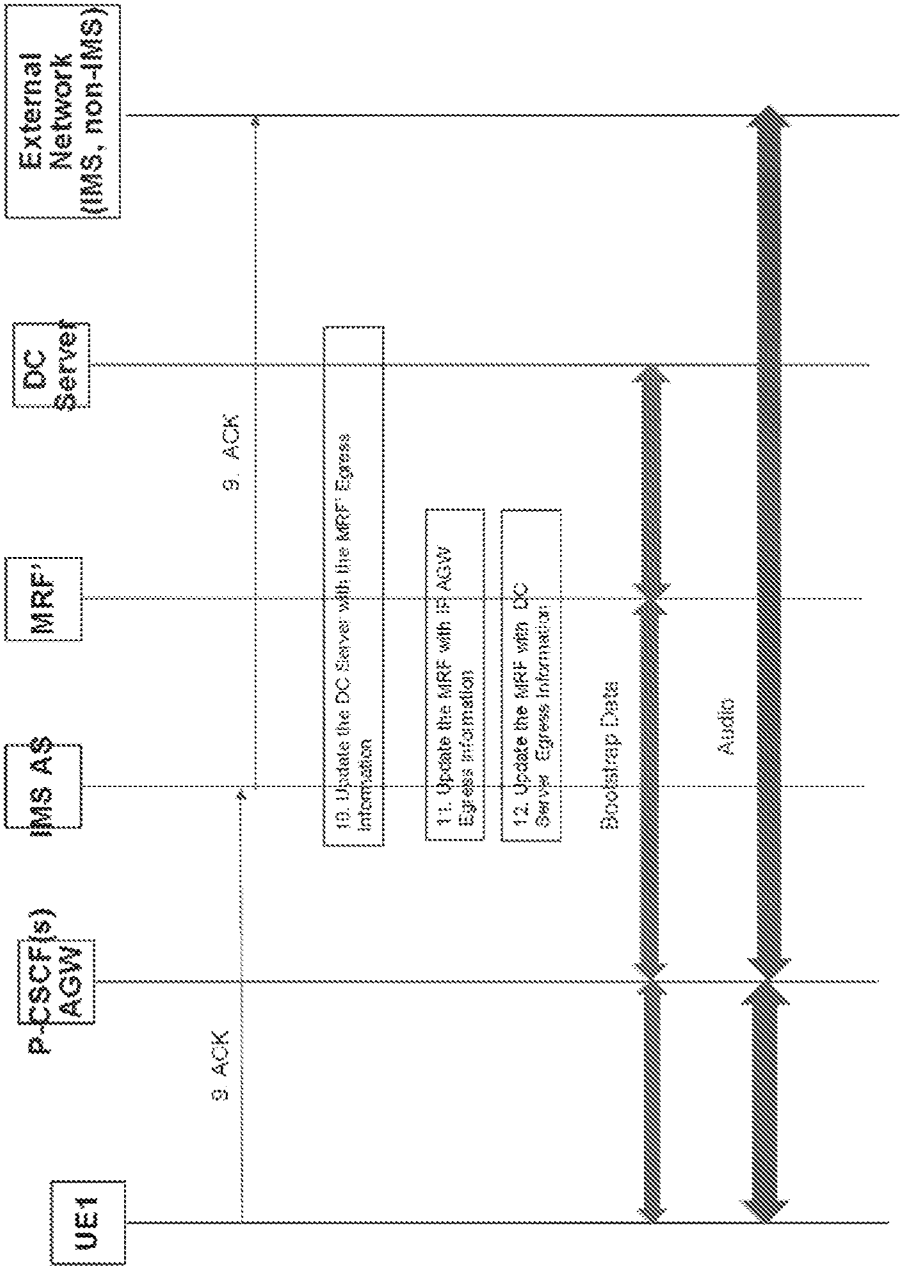
FIG. 13 shows a combined signalling scheme and flowchart depicting embodiments herein.

The call flow in FIG. 12-13 illustrates the various interactions within an IMS DC related session related to the DC feature. Interactions triggered by UEs related to the actual initiation of the bootstrapping in not included.

The following is a brief description of the steps in the call flow:

In step 1, UE registers in IMS after successfully establishing an IMS PDU session.

In step 2, UE initiates an IMS session, and indicates support for the IMD DC, in the SDP as per TS 26.114. It is assumed that the network also supports the IMS DC feature.

In step 3, the IMS AS initiates a request of type "Target Query" to verify if any of the participants in the IMS session has DC content that may require bootstrapping. The Request includes the IMS targets that are subject of the query. This step can also be postponed till after step 9.

In step 4, the IMS AS reserves the needed media resources for anchoring the bootstrap data. This step can also be performed after step 6.

In step 5-6, the session establishment procedure is successfully completed based on existing procedures. It is assumed in this call flow that both; originating and terminating UE support the IMS DC feature.

In step 7, if the IMS AS already reserved the media resources in MRF' for the bootstrap data, the IMS AS updates the SDP towards the UE so that the IMS AGW is updating with the media anchoring MRF' Ingress information related to the bootstrap data.

In step 9, the SIP ACK is sent to the target.

In step 10 DC Server is updated with the MRF' Egress information for the Bootstrap data.

The response may include the DC Server Bootstrapping addressing Information to be used by the MRF'

In step 11, IMS AS updates the media anchoring node MRF' with the IP AGW Egress information.

In step 12, the IMS AS may update the MRF' with the DC Server Bootstrapping addressing Information As can be seen the Bootstrap data traverses through MRF', while the actual voice media bypasses the MRF'

6.X.2.2 MRF' Services

The Table below illustrates main services provided by MRF'.

Editors Note: The parameter names are subject to change to be generic, and are FFS Editors Note: Additional parameters as we as the optionality are FFS.

| Service Name | Service Operations | Operation Semantics | Example Consumer(s) | Comments |
|---|---|---|---|---|
| Nmrf'_Session | Reserve | Request/Response | IMS AS | Input parameters includes the Session ID, Resource ID, Resource ID related Information. Expected output parameter is Success or Failure, as well as Resource related information e.g the Egress information to be used by the Resource ID. |
| | Update | Request/Response | IMS AS | Input parameters include the Session ID, Resource ID, and Resource ID related information, e.g the Egress/Ingress contact Information to be used by the MRF' for the related Media ID Expected output parameter is Success or Failure, as well as Resource ID related Information. |
| | Release | Request/Response | IMS AS | Input parameters includes the Session ID, and Resource ID. The absence of Resource ID implies the release of all resources associated with the Session ID. Expected output parameter is Success or Failure. |
| Nmrf'_EventExposure | Subscribe Unsubscribe Notify | Subscribe/Notify | FFS | FFS |

The procedure in FIG. 7*a* illustrates the expected interactions.

6.X.2.2 IMS AS-DC Server Interaction for Media Control

The procedure in FIG. 8*a* illustrates the interaction between the IMS AS and DC server in support of DC media.

Once the IMS AS reserves the necessary resources in MRF' for the media that has to be managed by the IMS session and the DC server, the IMS AS needs to inform the DC Server of the Egress information to be used for the media.

The IMS AS uses the same media ID, corresponding to the one used for reserving the needed resources I the MRF'.

The DC server returns' the DC Bootstrapping addressing Information

Editor's note: It is FFS if more than one Media ID can be used in a single request to the DC Server.

6.X.3 Impacts on Existing Nodes and Functionality

Editor's note: This clause captures impacts on existing 3GPP nodes and functional elements.

End of Changes

1. Proposal

It is proposed to accept the following changes to TR 23.700-78

First Change

4 Architectural Assumptions and Principles

FIG. 9*a* depicts a high level architecture diagram showing the architecture of the IMS for supporting the IMS Data Channel feature, illustrating the interworking between IMS and other entities needed to support DC feature.

In this architecture, the IMS MRF can be enhanced to support additional functionality related to DC server while maintaining backward compatibility.

The IMS MRF' is a new service based MRF for the purpose of interaction with the Web Server, and the IMS AS.

The FIG. 9*a* includes as well the following interfaces:

IF1 between the MRF' and DC server for media transport related to bootstrapping and application data.

IF2 between third party AS and the Operator IT network, where it is assumed the DC server is hosted.

IF3 between the IMS AS and DC server for managing DC feature related to IMS channel including media control.

IF4 between the IMS AS and the service based MRF for managing Medi Resources related to DC channel.

IF1, IF3, and IF4 are all in scope of the TR.

IF2 is out of scope of the TR.

The invention claimed is:

1. A method performed by a first network node, such as an Internet Protocol Multimedia Subsystem Application Server (IMS AS), for handling an IMS session of one or more user equipments (UEs), in a communication network, the method comprising:

obtaining data relating to bootstrapping of data channel information to the IMS session;

determining that one or more UEs in the IMS session support data channel content communication; and in response to determining that one or more UEs in the IMS session support data channel content communication, reserving one or more needed media resources at a second network node, such as an enhanced Media Resource Function (MRF), for bootstrapping data channel information to the IMS session, wherein the reserving occurs prior to providing resource information to a third network node for bootstrapping.

2. The method according to claim 1, wherein reserving the needed one or more media resources comprises transmitting a request to the second network node to reserve media resources, and receiving a response from the second network node.

3. The method according to claim 2, wherein the response comprises resource information such as MRF egress information.

4. The method according to claim 1, further comprising providing, to the second network node and/or the third network node, such as a data channel (DC) server, contact information relating to the IMS session, e.g. address information, Internet Protocol (IP) information, and/or UE information, and/or resource information required for bootstrapping the data channel information to the IMS session.

5. The method according to claim 4, wherein providing contact information and/or resource information to the second network node and/or the third network node comprises updating the third network node with MRF egress information, or requesting the contact information from the third network node, and receiving a response comprising contact information of the third network node such as the DC Server ingress Information, or a separate subsequent request including contact information of the third network node.

6. The method according to claim 4, wherein providing contact information and/or resource information to the second network node and/or the third network node comprises updating the second network node with Internet Protocol (IP) Access Gateway (AGW) Egress information and/or with DC Server ingress Information.

7. A first network node, such as an Internet Protocol Multimedia Subsystem Application Server (IMS AS), for handling an IMS session of one or more user equipments (UEs), in a communication network, wherein the first network node is configured to perform the steps of claim 1.

8. A computer program product comprising instructions, which, when executed on at least one processor, cause the at least one processor to carry out the method according to claim 1, as performed by the first network node.

9. A computer-readable storage medium, having stored thereon a computer program product comprising instructions which, when executed on at least one processor, cause the at least one processor to carry out the method according to claim 1, as performed by the first network node.

10. A method performed by a second network node (14), such as an enhanced Media Resource Function (MRF), or MRF node, for handling an Internet Protocol Multimedia Subsystem (IMS), session of one or more user equipments (UEs), in a communication network, the method comprising:

receiving a request from a first network node, such as an Internet Protocol Multimedia Subsystem Application Server (IMS AS), the request being sent in response to the first network node determining that one or more UEs in the IMS session support data channel content communication, the request indicating a need to reserve one or more media resources for bootstrapping data channel (DC) media information to the IMS session, wherein the request is received prior to the first network node providing resource information to a third network node for bootstrapping; and transmitting a response to the first network node (13), wherein the response indicates rejection or confirmation of one or more media resources reserved for the IMS session.

11. The method according to claim 10, further comprising:

reserving one or more media resources and mapping a session identifier (ID) to the reserved one or more media resources.

12. The method according to claim 10, further comprising:

obtaining contact information and/or resource information for bootstrapping the DC media information to the IMS session.

13. The method according to claim 12, wherein obtaining the contact information and/or resource information comprises receiving from the first network node Internet Protocol, IP, Access Gateway, AGW, Egress information and/or with DC Server ingress Information.

14. A second network node, such as an enhanced Media Resource Function (MRF) node, for handling an Internet Protocol Multimedia Subsystem (IMS) session of one or more user equipments (UEs), in a communication network, wherein the second network node is configured to perform of the steps of claim 10.

15. A method performed by a third network node (15), such as a data channel (DC) server, for handling an Internet Protocol Multimedia Subsystem (IMS) session of one or more user equipments (UEs), in a communication network, the method comprising obtaining contact and/or resource information required for bootstrapping data channel information to the IMS session, wherein the resource information is related to one or more media resources reserved for the IMS session in response to a first network node, such as an Internet Protocol Multimedia Subsystem Application Server (IMS AS), determining that one or more UEs in the IMS session support data channel content communication, and wherein the one or more media resources were reserved prior to the obtaining of the resource information.

16. The method according to claim 15, wherein obtaining resource information comprises receiving from the first network node Media Resource Function, MRF, Egress information, such as address, for Bootstrap data.

17. The method according to claim 15, further comprising transmitting a response, to a request or the obtained resource information, to the first network node, wherein the response comprises contact information of the third network node, such as the DC Server ingress Information, or transmit a separate subsequent request including contact information of the third network node.

18. A third network node (15), such as a data channel (DC) server, for handling an Internet Protocol Multimedia Subsystem (IMS) session of one or more user equipments (UEs), in a communication network, wherein the third network node is configured to perform the steps of claim 15.

* * * * *